(12) United States Patent
Kim et al.

(10) Patent No.: US 11,981,333 B2
(45) Date of Patent: May 14, 2024

(54) METHOD AND DEVICE FOR TRANSMITTING ABNORMAL OPERATION INFORMATION

(71) Applicant: LG ELECTRONICS INC., Seoul (KR)

(72) Inventors: Myoungseob Kim, Seoul (KR); Hanbyul Seo, Seoul (KR); Jaeho Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 176 days.

(21) Appl. No.: 17/633,164

(22) PCT Filed: Mar. 6, 2020

(86) PCT No.: PCT/KR2020/003150
§ 371 (c)(1),
(2) Date: Feb. 4, 2022

(87) PCT Pub. No.: WO2021/025252
PCT Pub. Date: Feb. 11, 2021

(65) Prior Publication Data
US 2022/0297699 A1      Sep. 22, 2022

(30) Foreign Application Priority Data

Aug. 5, 2019  (KR) .................. 10-2019-0094682
Aug. 5, 2019  (KR) .................. 10-2019-0094687

(51) Int. Cl.
*B60W 40/09*      (2012.01)
*H04W 4/02*       (2018.01)
(Continued)

(52) U.S. Cl.
CPC ............ *B60W 40/09* (2013.01); *H04W 4/023* (2013.01); *H04W 4/06* (2013.01); *H04W 4/44* (2018.02);
(Continued)

(58) Field of Classification Search
CPC ......... B60W 40/09; B60W 2040/0827; B60W 2540/221; B60W 2540/229;
(Continued)

(56) References Cited

U.S. PATENT DOCUMENTS

2013/0226408 A1*  8/2013  Fung ............... G08G 1/166
                                                    701/1
2016/0023599 A1*  1/2016  Jo ................. G08G 1/161
                                                  340/903
(Continued)

FOREIGN PATENT DOCUMENTS

JP    2019034575     3/2019
KR    20100117861    11/2010
(Continued)

OTHER PUBLICATIONS

PCT International Application No. PCT/KR2020/003150, International Search Report dated Nov. 19, 2020, 4 pages.

*Primary Examiner* — Mohamed Barakat
*Assistant Examiner* — Sharmin Akhter
(74) *Attorney, Agent, or Firm* — LEE, HONG, DEGERMAN, KANG & WAIMEY

(57) ABSTRACT

Presented in the present disclosure is a method by which a driver situation monitoring device or adjacent vehicles detect the situation of a driver and/or a vehicle in which an abnormality occurs while driving, and provide, through a V2X communication device, the information to the vehicle in which the abnormality has occurred and adjacent vehicles, networks or related organizations, and thus acci- (Continued)

dents can be prevented or a vehicle in which an abnormality occurs can be controlled.

5 Claims, 43 Drawing Sheets

(51) Int. Cl.
  *H04W 4/06*   (2009.01)
  *H04W 4/44*   (2018.01)
  *H04W 4/90*   (2018.01)
  *H04W 72/21*   (2023.01)
  *B60W 40/08*   (2012.01)

(52) U.S. Cl.
  CPC ............. *H04W 4/90* (2018.02); *H04W 72/21* (2023.01); *B60W 2040/0827* (2013.01); *B60W 2540/221* (2020.02); *B60W 2540/229* (2020.02); *B60W 2554/80* (2020.02); *B60W 2556/45* (2020.02)

(58) Field of Classification Search
  CPC ......... B60W 2554/80; B60W 2556/45; H04W 4/023; H04W 4/06; H04W 4/44; H04W 4/90; H04W 72/21; H04W 4/029; H04W 4/46; H04W 92/18; G08G 1/0968
  See application file for complete search history.

(56) References Cited

U.S. PATENT DOCUMENTS

| | | | |
|---|---|---|---|
| 2017/0096063 A1* | 4/2017 | Jang | ................. G08B 21/02 |
| 2018/0162267 A1 | 6/2018 | Kline et al. | |
| 2021/0018913 A1* | 1/2021 | Hanawa | ............... G05D 1/0027 |
| 2022/0340130 A1* | 10/2022 | Motoyama | ............ G01S 17/931 |

FOREIGN PATENT DOCUMENTS

| | | |
|---|---|---|
| KR | 20190004567 | 1/2019 |
| KR | 20190078553 | 7/2019 |

* cited by examiner

FIG. 9
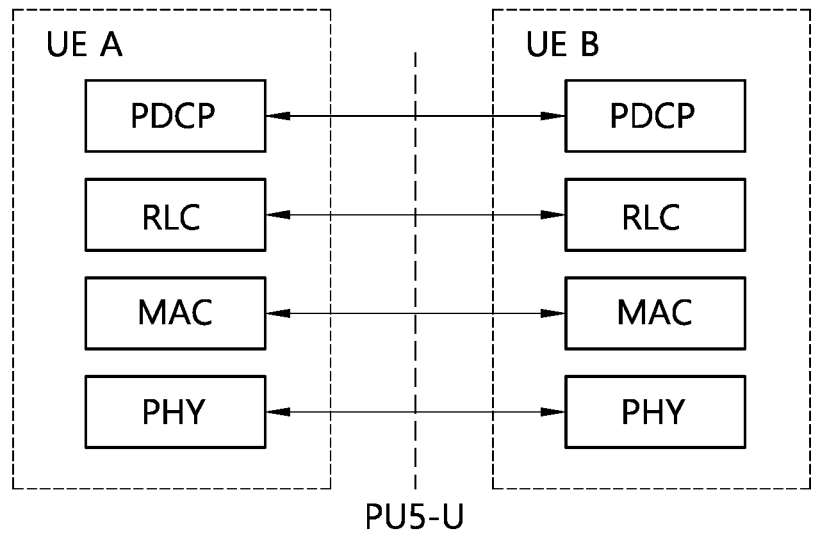
(a)
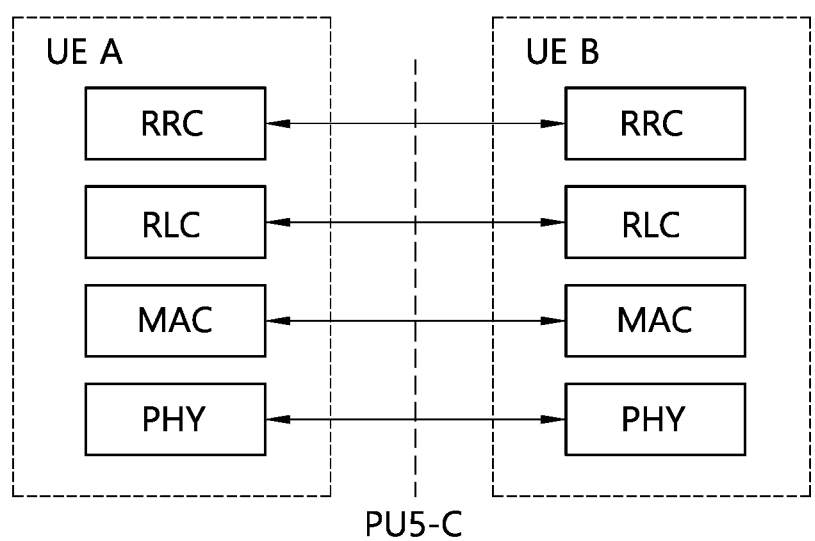
(b)

FIG. 10
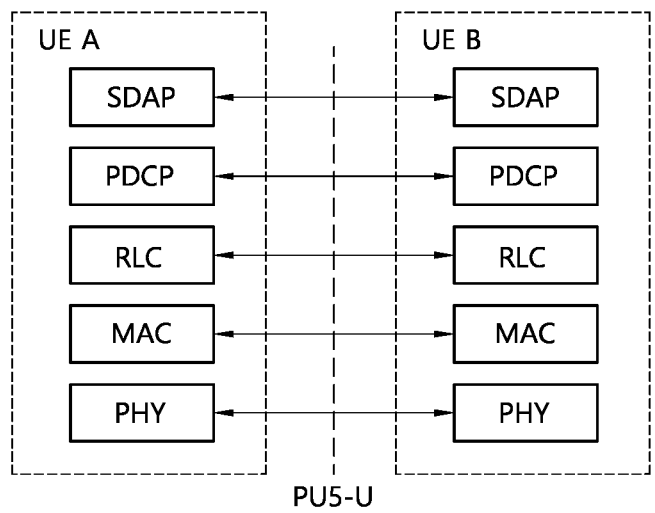
(a)
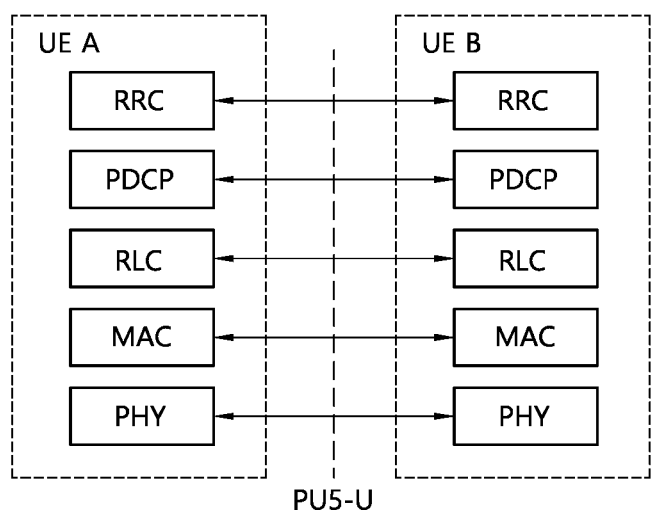
(b)

METHOD AND DEVICE FOR TRANSMITTING ABNORMAL OPERATION INFORMATION

CROSS-REFERENCE TO RELATED APPLICATIONS

This application is the National Stage filing under 35 U.S.C. 371 of International Application No. PCT/KR2020/003150, filed on Mar. 6, 2020, which claims the benefit of earlier filing date and right of priority to Korean Application Nos. 10-2019-0094682, filed on Aug. 5, 2019, and 10-2019-0094687, filed on Aug. 5, 2019, the contents of which are all incorporated by reference herein in their entirety.

BACKGROUND OF THE DISCLOSURE

Field of the Disclosure

The present disclosure relates to wireless communication.

Related Art

V2X means communication between a terminal installed in a vehicle and other terminals, and the other terminals may be a pedestrian, a vehicle, and an infrastructure, and in this case, the other terminals may be sequentially called vehicle to pedestrian (V2P), vehicle to vehicle (V2V), vehicle to infrastructure (V2I), etc.

In V2X communication, data/control information may be transmitted and received through a sidelink defined in a D2D operation other than an uplink/downlink between a base station and the terminal used in conventional LTE communication.

SUMMARY

The present disclosure provides a method in which a driver status monitoring device or surrounding vehicles sense a status of a driver and/or a vehicle in which abnormality occurs upon driving, and a corresponding vehicle in which the abnormality occurs also announces the information to the surrounding vehicle, a network, or a related organization through a V2X communication device to prevent an accident or control the vehicle in which the abnormality occurs.

According to the present disclosure, a vehicle which is abnormally operated can be autonomously sensed by the abnormally operated vehicle or sensed by a surrounding vehicle of the abnormally operated vehicle, and furthermore, an appropriate motion is taken to secure road safety more rapidly and directly.

An effect which can be obtained through one specific example of the present disclosure is not limited to effects listed above. For example, there can be various technical effects which a person having ordinary skill in the related art can appreciate and derive from the present disclosure. As a result, the specific effect of the present disclosure is not limited to an effect explicitly disclosed in the present disclosure, but may include various effects which can be appreciated or derived from a technical feature of the present disclosure.

BRIEF DESCRIPTION OF THE DRAWINGS

FIG. 9 shows a radio protocol architecture for a SL communication, in accordance with an embodiment of the present disclosure.

FIG. 10 shows a radio protocol architecture for a SL communication, in accordance with an embodiment of the present disclosure.

DESCRIPTION OF EXEMPLARY EMBODIMENTS

Figure 1:
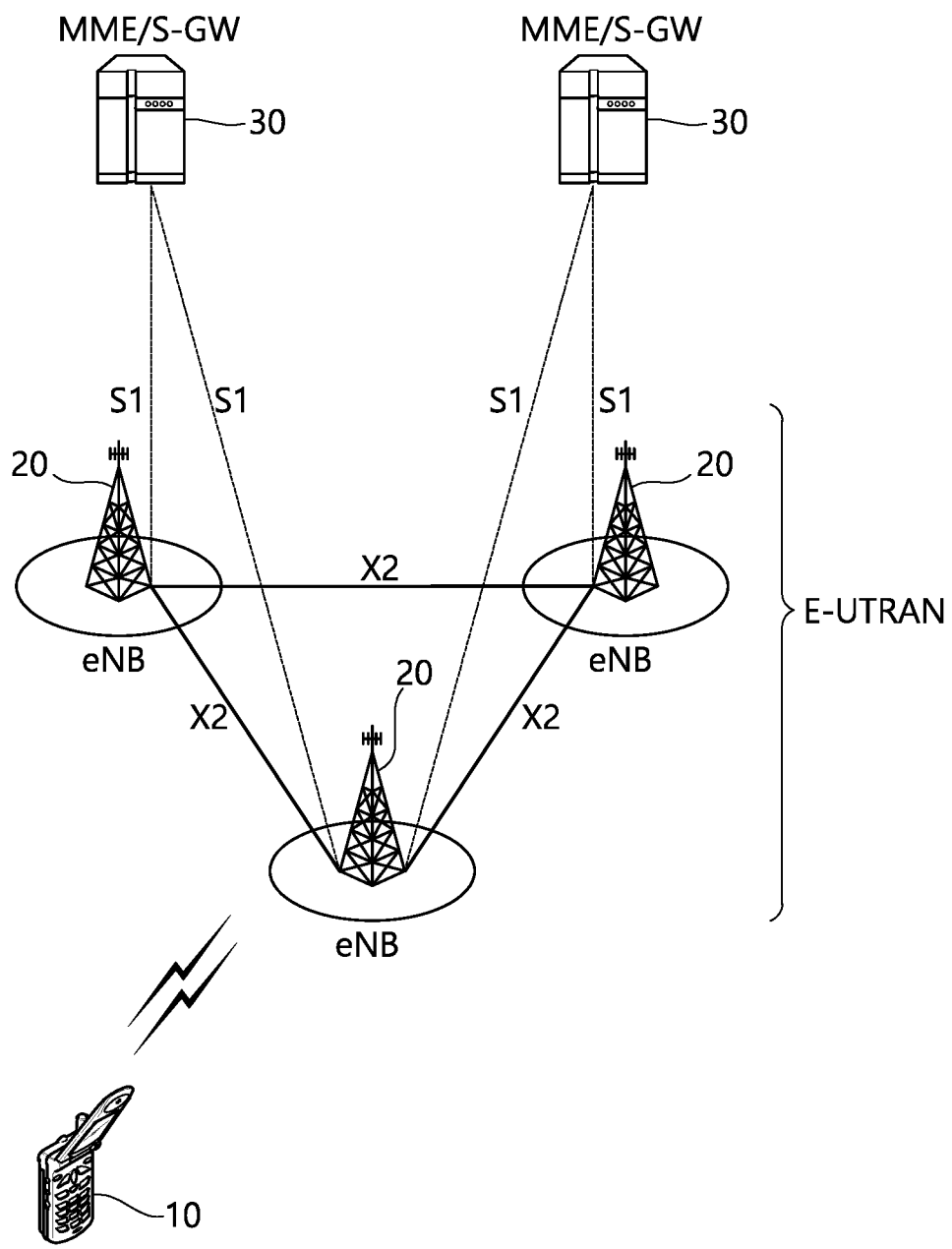
FIG. 1 shows a structure of an LTE system, in accordance with an embodiment of the present disclosure.

In the present disclosure, "A or B" may mean "only A", "only B" or "both A and B". When expressed separately, "A or B" may be interpreted as "A and/or B" in the present disclosure. For example, in the present disclosure, "A, B or C" may mean "only A", "only B", "only C", or "any combination of A, B and C".

A slash (/) or a comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B" or "both A and B". Also, in the present disclosure, the expression "at least one of A or B" or "at least one of A and/or B" may be interpreted the same as "at least one of A and B".

Also, in the present disclosure, "at least one of A, B and C" may mean "only A", "only B", "only C", or "any combination of A, B and C". Also, "at least one of A, B or C" or "at least one of A, B and/or C" may mean "at least one of A, B and C".

In addition, parentheses used in the present disclosure may mean "for example". Specifically, when "control information (PDCCH)" is indicated, "PDCCH" may be proposed as an example of "control information". When separately expressed, "control information" in the present disclosure may be not limited to "intra prediction", and "PDCCH" may be proposed as an example of "control information". Further, when "control information (i.e., PDCCH)" is indicated, "PDCCH" may be proposed as an example of "control information".

The following technology may be used for various wireless communication systems which include code division multiple access (CDMA), frequency division multiple access (FDMA), time division multiple access (TDMA), orthogonal frequency division multiple access (OFDMA), single carrier frequency division multiple access (SC-FDMA), non-orthogonal multiple access (NOMA), and the like. The CDMA may be implemented as radio technology such as Universal Terrestrial Radio Access (UTRA) or CDMA2000. The TDMA may be implemented as radio technology such as global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802, Evolved UTRA (E-UTRA), or the like. IEEE 802.16m as an evolution of IEEE 802.16e provides backward compatibility with a system based on IEEE 802.16e. The UTRA is part of Universal Mobile Telecommunications System (UMTS). 3rd Generation Partnership Project (3GPP) Long Term Evolution (LTE) as a part of Evolved UMTS (E-UMTS) using the E-UTRA (evolved-UMTS terrestrial radio access) adopts OFDMA in downlink and adopts SC-FDMA in uplink. LTE-Advanced (A) is evolution of LTE.

5G NR as subsequent technology is a new clean-slate type mobile communication system having features such as high performance, low latency, high availability, etc. 5G NR may utilize all available spectrum resources such as intermediate frequency band of 1 GHz to 10 GHz, a high-frequency (millimeter wave) band of 24 GHz or more, etc., from a low-frequency band less than 1 GHz.

For clear description, LTE-A or 5G NR is primarily described, but a technical spirit of the present disclosure is not limited thereto. The LTE-A or 5G NR may be referred to as an evolved-UMTS terrestrial radio access network (E-UTRAN) or long term evolution (LTE)/LTE-A system.

FIG. 1 shows a structure of an LTE system, in accordance with an embodiment of the present disclosure. This may also be referred to as an Evolved-UMTS Terrestrial Radio Access Network (E-UTRAN), or a Long Term Evolution (LTE)/LTE-A system.

Referring to FIG. 1, the E-UTRAN includes a base station (BS) 20, which provides a control plane and a user plane to a user equipment (UE) 10. The UE 10 may be fixed or mobile and may also be referred to by using different terms, such as Mobile Station (MS), User Terminal (UT), Subscriber Station (SS), Mobile Terminal (MT), wireless device, and so on. The base station 20 refers to a fixed station that communicated with the UE 10 and may also be referred to by using different terms, such as evolved-NodeB (eNB), Base Transceiver System (BTS), Access Point (AP), and so on.

The base stations 20 are interconnected to one another through an 23 interface. The base stations 20 are connected to an Evolved Packet Core (EPC) 30 through an S1 interface. More specifically, the base station 20 are connected to a Mobility Management Entity (MME) through an S1-MME interface and connected to Serving Gateway (S-GW) through an S1-U interface.

The EPC 30 is configured of an MME, an S-GW, and a Packet Data Network-Gateway (P-GW). The MME has UE access information or UE capability information, and such information may be primarily used in UE mobility management. The S-GW corresponds to a gateway having an E-UTRAN as its endpoint. And, the P-GW corresponds to a gateway having a Packet Data Network (PDN) as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 2:
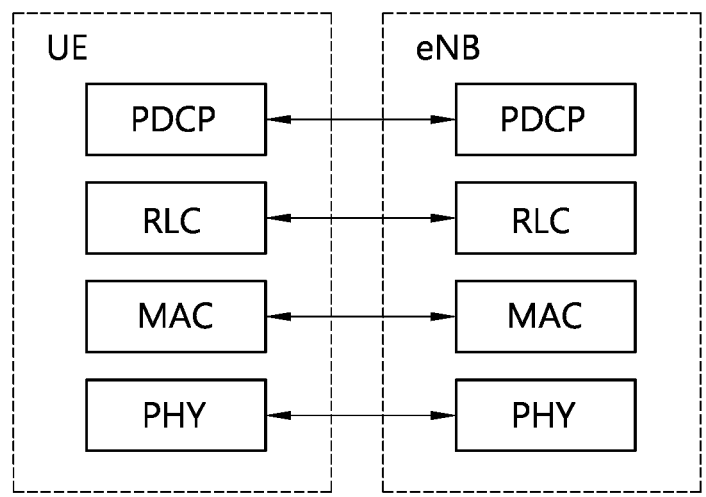
FIG. 2 shows a radio protocol architecture of a user plane, in accordance with an embodiment of the present disclosure.
Figure 3:
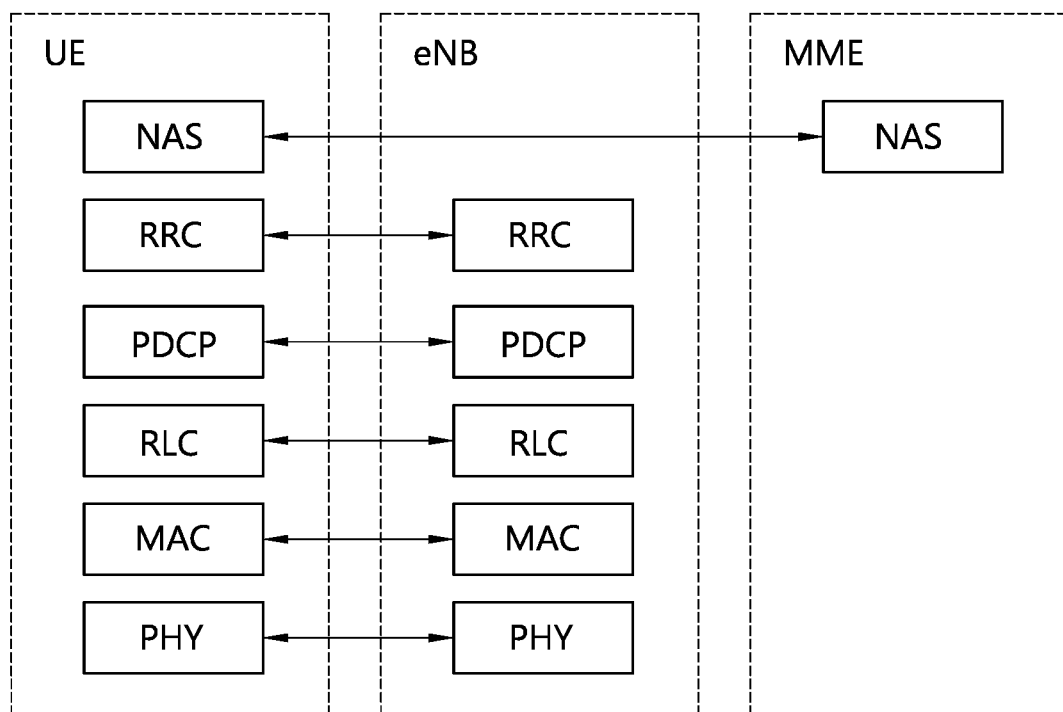
FIG. 3 shows a radio protocol architecture of a control plane, in accordance with an embodiment of the present disclosure.

FIG. 2 shows a radio protocol architecture of a user plane, in accordance with an embodiment of the present disclosure. FIG. 3 shows a radio protocol architecture of a control plane, in accordance with an embodiment of the present disclosure. The user plane corresponds to a protocol stack for user data transmission, and the control plane corresponds to a protocol stack for control signal transmission.

Referring to FIG. 2 and FIG. 3, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (physical layer or PHY layer) and the second layer (MAC layer, RLC layer, Packet Data Convergence Protocol (PDCP) layer) in order to transport data between the UE and the network.

Functions of a PDCP layer in the user plane include transfer, header compression, and ciphering of user data. Functions of a PDCP layer in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 4:
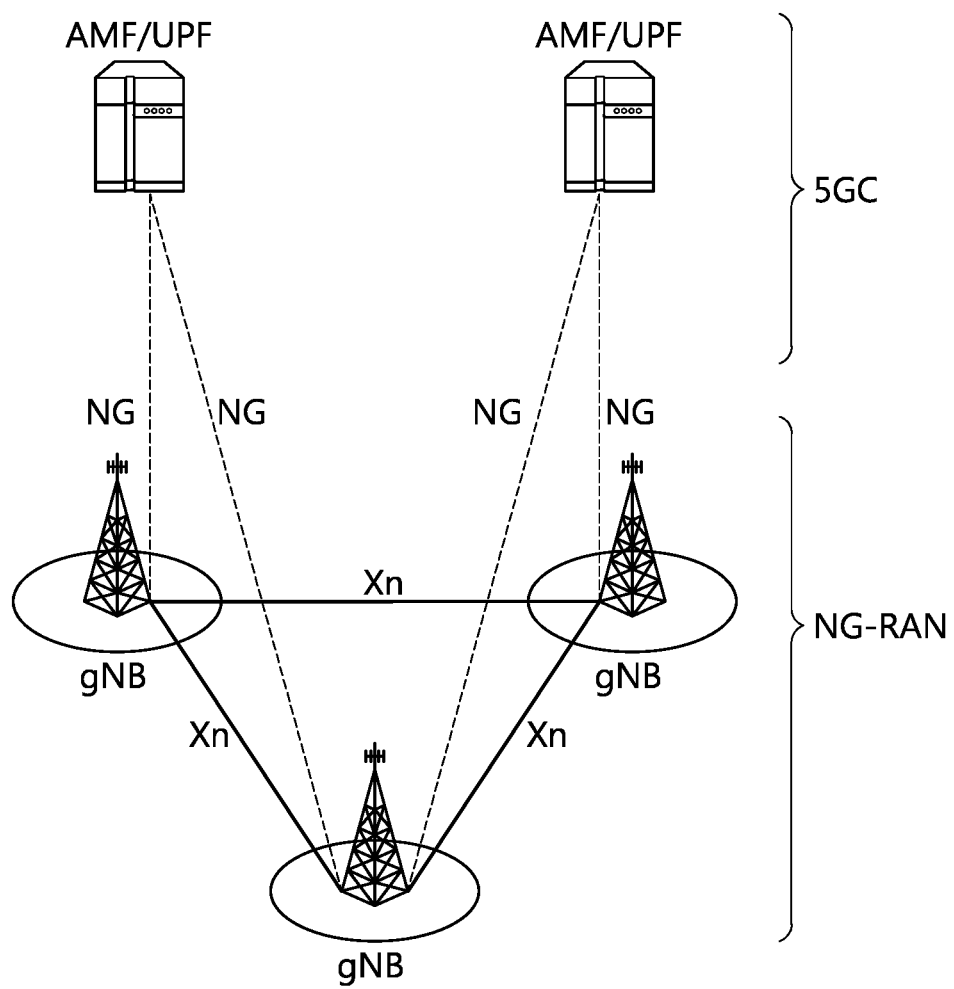
FIG. 4 shows a structure of an NR system, in accordance with an embodiment of the present disclosure.

FIG. 4 shows a structure of an NR system, in accordance with an embodiment of the present disclosure.

Referring to FIG. 4, a Next Generation-Radio Access Network (NG-RAN) may include a next generation-Node B (gNB) and/or eNB providing a user plane and control plane protocol termination to a user. FIG. 4 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 5:
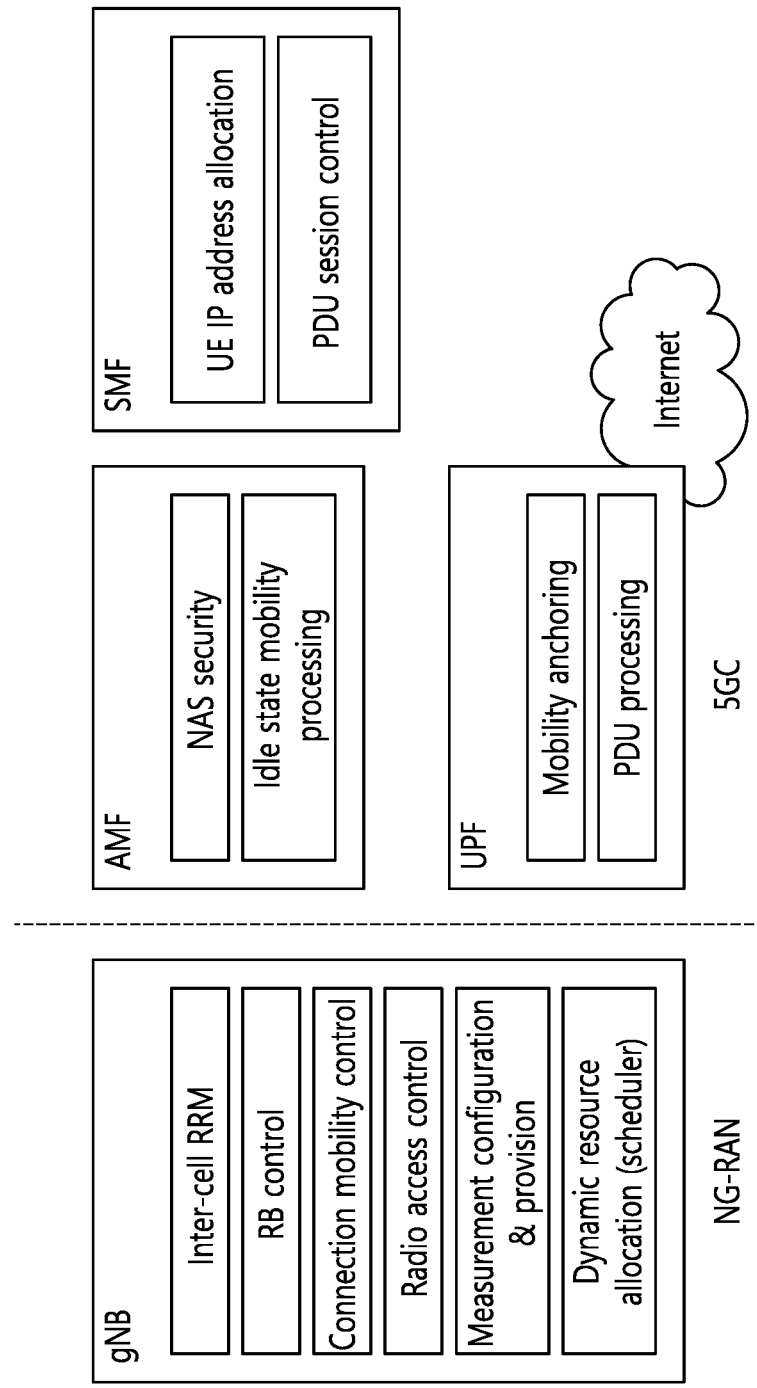
FIG. 5 shows a functional division between an NG-RAN and a SGC, in accordance with an embodiment of the present disclosure.

FIG. 5 shows a functional division between an NG-RAN and a 5GC, in accordance with an embodiment of the present disclosure.

Referring to FIG. 5, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Figure 6:
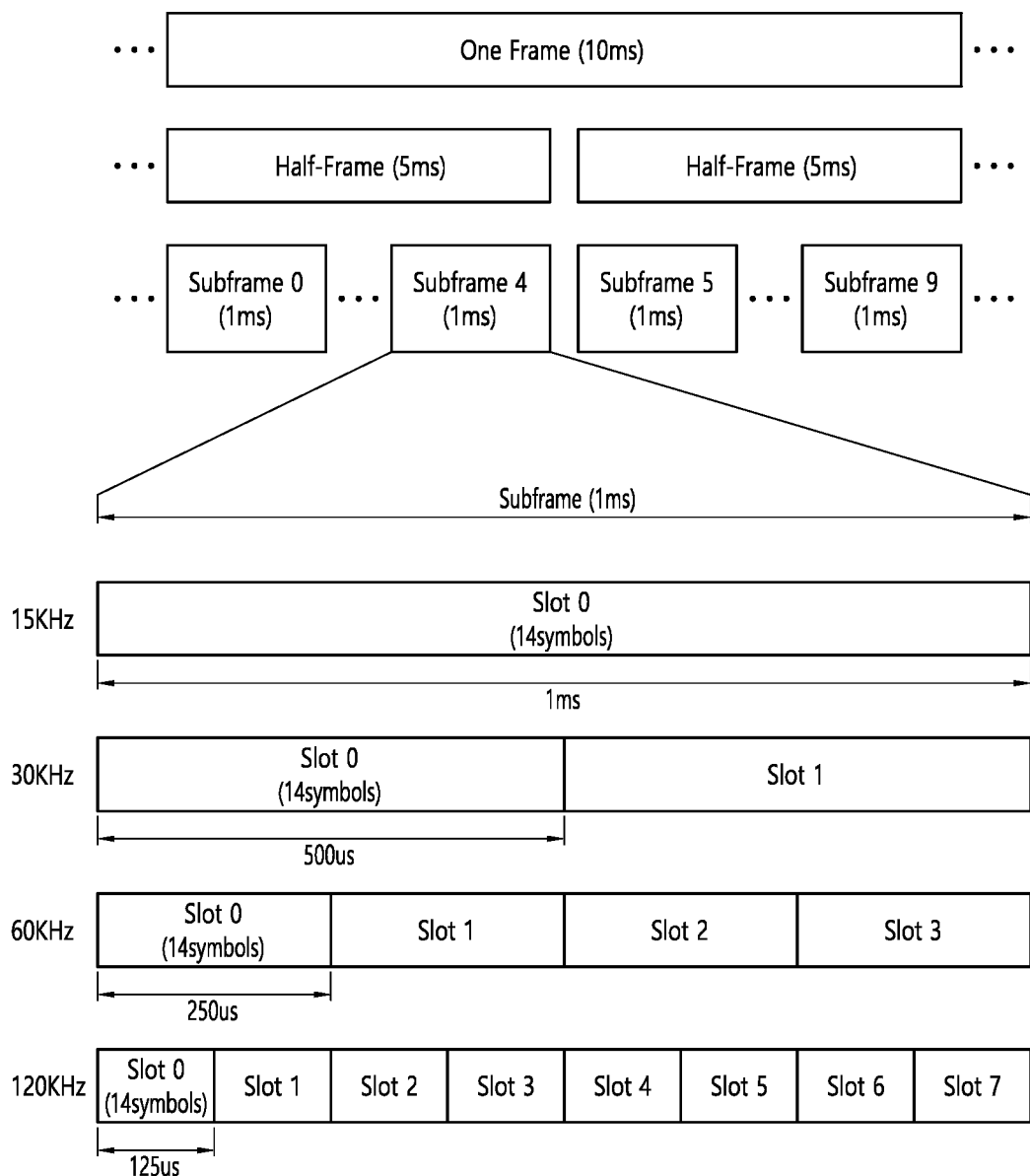
FIG. 6 shows a structure of a radio frame of an NR, in accordance with an embodiment of the present disclosure.

FIG. 6 shows a structure of a radio frame of an NR, in accordance with an embodiment of the present disclosure.

Referring to FIG. 6, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15 * 2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15 * 2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
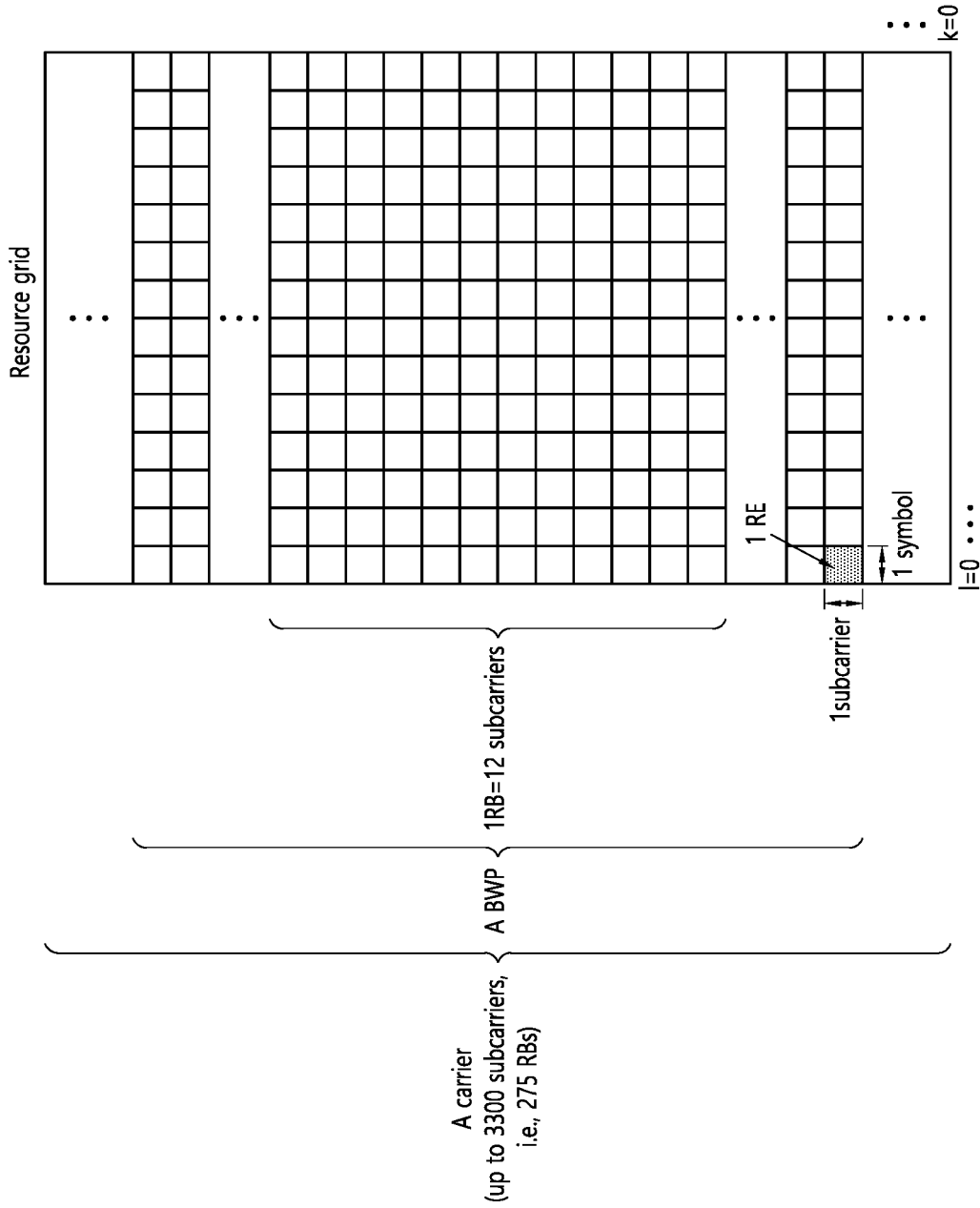
FIG. 7 shows a structure of a slot of an NR frame, in accordance with an embodiment of the present disclosure.

FIG. 7 shows a structure of a slot of an NR frame, in accordance with an embodiment of the present disclosure.

Referring to FIG. 7, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the location of the bandwidth may move in a frequency domain. For example, the location of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be referred to as a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 8:
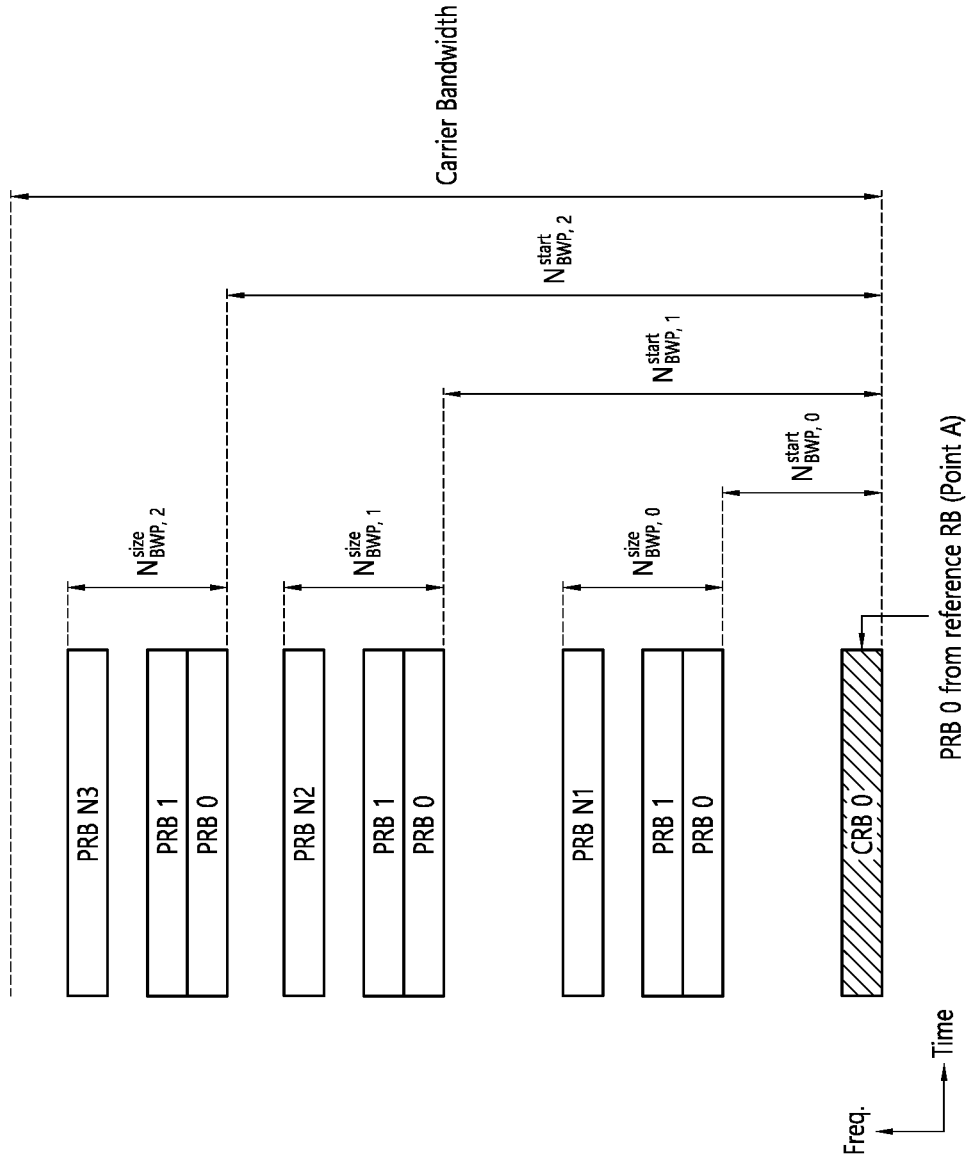
FIG. 8 shows a BWP based on an embodiment of the present disclosure.

FIG. 8 shows a BWP based on an embodiment of the present disclosure. It is assumed in the embodiment of FIG. 8 that the number of BWPs is 3.

Referring to FIG. 8, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 9 shows a radio protocol architecture for a SL communication, in accordance with an embodiment of the present disclosure. The embodiment of FIG. 9 may be combined with various embodiments of the present disclosure. More specifically, (a) of FIG. 9 shows a user plane protocol stack of LTE, and (b) of FIG. 9 shows a control plane protocol stack of LTE.

FIG. 10 shows a radio protocol architecture for a SL communication, in accordance with an embodiment of the present disclosure. The embodiment of FIG. 10 may be combined with various embodiments of the present disclosure. More specifically, (a) of FIG. 10 shows a user plane protocol stack of NR, and (b) of FIG. 10 shows a control plane protocol stack of NR.

Hereinafter, a Sidelink Synchronization Signal (SLSS) and synchronization information will be described in detail.

The SLSS is a sidelink specific sequence, which may include a Primary Sidelink Synchronization Signal (PSSS) and a Secondary Sidelink Synchronization Signal (SSSS). The PSSS may be referred to as Sidelink Primary Synchronization Signal(S-PSS) and the SSSS may be referred to as Sidelink Secondary Synchronization Signal (S-SSS).

A Physical Sidelink Broadcast Channel (PSBCH) may refer to a (broadcast) channel through which (system) information, which consist of default (or basic) information that should first be known by the UE before the sidelink signal transmission/reception. For example, the default (or basic) information may be information related to the SLSS, a Duplex Mode (DM), TDD UL/DL configuration, information related to resource pools, types of applications related to the SLSS, a subframe offset, broadcast information, and so on.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. In addition, a frequency position of the S-SSB may be (pre-)configured. Accordingly, the UE does not need to perform hypothesis detection at frequency to discover the S-SSB in the carrier.

Each SLSS may have a physical layer sidelink synchronization identity (ID), and the values may be respectively equal to any one value ranging from 0 to 335. Depending upon any one of the above-described values that is used, a synchronization source may also be identified. For example, values of 0, 168, 169 may indicate the GNSS, values from 1 to 167 may indicate base stations, and values from 170 to 335 may indicate that the source is outside of the coverage. Alternatively, among the physical layer sidelink synchronization ID values, values 0 to 167 may be values being used by a network, and values from 168 to 335 may be values being used outside of the network coverage.

Figure 11:
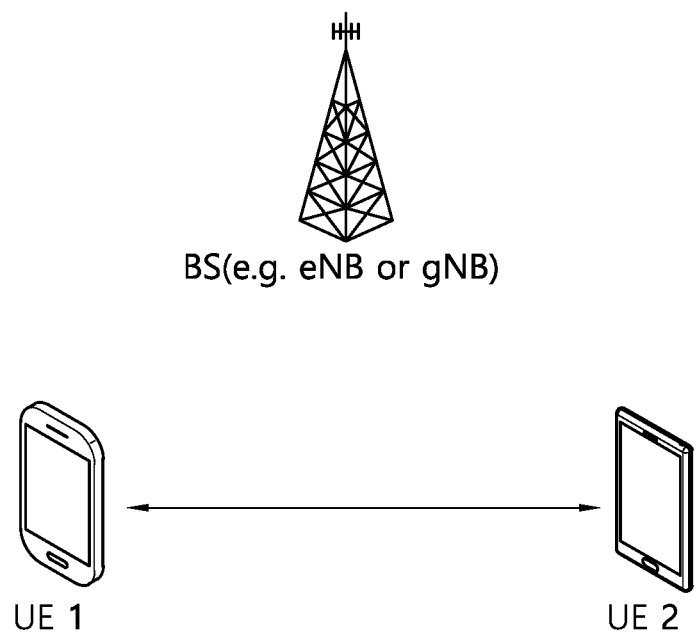
FIG. 11 shows a UE performing V2X or SL communication in accordance with an embodiment of the present disclosure.

FIG. 11 shows a UE performing V2X or SL communication in accordance with an embodiment of the present disclosure.

Referring to FIG. 11, in V2X or SL communication, the term 'UE' may generally imply a UE of a user. However, if a network equipment such as a BS transmits/receives a signal based on a communication scheme between UEs, the BS may also be regarded as a sort of the UE.

For example, the UE 1 may select a resource unit corresponding to a specific resource in a resource pool which implies a set of series of resources. In addition, the UE 1 may transmit an SL signal by using the resource unit. For example, the UE 2 which is a receiving UE may be allocated with a resource pool in which the UE 1 is capable of transmitting a signal, and may detect a signal of the UE 1 in the resource pool.

Herein, if the UE 1 is within a coverage of the BS, the BS may inform the UE 1 of the resource pool. Otherwise, if the UE 1 is out of the coverage of the BS, another UE may inform the UE 1 of the resource pool, or the UE 1 may use a pre-configured resource pool.

In general, the resource pool may be configured based on a plurality of resource units, and each UE may select at least one resource unit for SL signal transmission.

Figure 12:
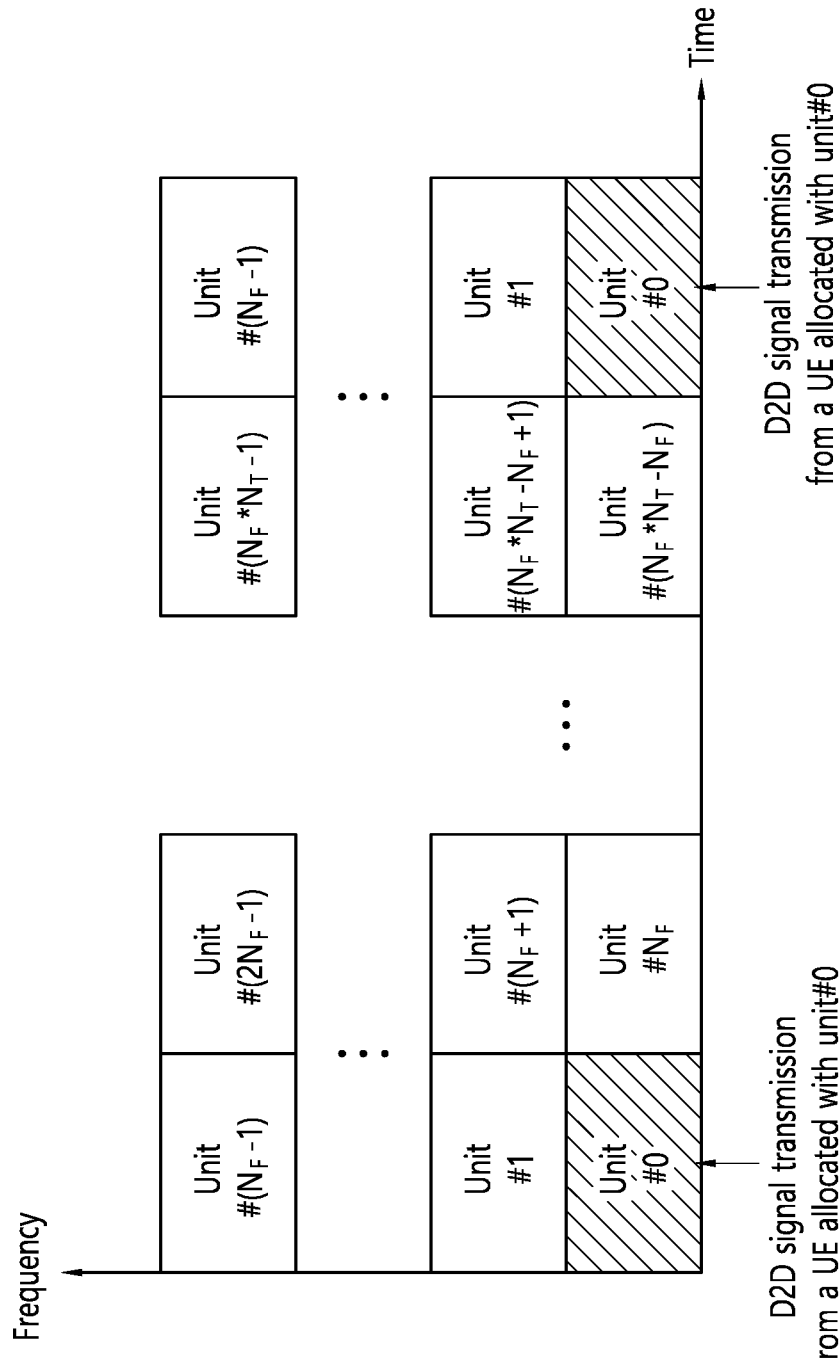
FIG. 12 shows a resource unit for V2X or SL communication based on an embodiment of the present disclosure.

FIG. 12 shows a resource unit for V2X or SL communication based on an embodiment of the present disclosure.

Referring to FIG. 12, all frequency resources of a resource pool may be divided into $N_F$ resources, and all time resources of the resource pool may be divided into $N_T$ resources. Therefore, $N_F*N_T$ resource units may be defined in the resource pool. FIG. A12 may show an example of a case where a corresponding resource pool is repeated with a period of $N_T$ subframes.

As shown in FIG. 12, one resource unit (e.g., Unit #0) may be periodically repeated. Alternatively, to obtain a diversity effect in a time or frequency domain, an index of a physical resource unit to which one logical resource unit is mapped may change to a pre-determined pattern over time. In a structure of such a resource unit, the resource pool may imply a set of resource units that can be used in transmission by a UE intending to transmit an SL signal.

The resource pool may be subdivided into several types. For example, based on content of an SL signal transmitted in each resource pool, the resource pool may be classified as follows.

(1) Scheduling assignment (SA) may be a signal including information related to a location of a resource used for transmission of an SL data channel by a transmitting UE, a modulation and coding scheme (MCS) or multiple input multiple output (MIMO) transmission scheme required for demodulation of other data channels, timing advance (TA), or the like. The SA can be transmitted by being multiplexed together with SL data on the same resource unit. In this case, an SA resource pool may imply a resource pool in which SA is transmitted by being multiplexed with SL data. The SA may also be referred to as an SL control channel.

(2) An SL data channel (physical sidelink shared channel (PSSCH)) may be a resource pool used by the transmitting UE to transmit user data. If SA is transmitted by being multiplexed together with SL data on the same resource unit, only an SL data channel of a type except for SA information may be transmitted in the resource pool for the SL data channel. In other words, resource elements (REs) used to transmit SA information on an individual resource unit in the SA resource pool may be used to transmit SL data still in the resource pool of the SL data channel. For example, the transmitting UE may transmit the PSSCH by mapping it to consecutive PRBs.

(3) A discovery channel may be a resource pool for transmitting, by the transmitting UE, information related to an ID thereof, or the like. Accordingly, the transmitting UE may allow an adjacent UE to discover the transmitting UE itself.

Even if the aforementioned SL signals have the same content, different resource pools may be used based on a transmission/reception attribute of the SL signals. For example, even the same SL data channel or discovery message may be classified again into different resource pools based on a scheme of determining SL signal transmission timing (e.g., whether it is transmitted at a reception time of a synchronization reference signal or transmitted by applying a specific timing advance at the reception time), a resource allocation scheme (e.g., whether a BS designates a transmission resource of an individual signal to an individual transmitting UE or whether the individual transmitting UE autonomously selects an individual signal transmission resource in a resource pool), a signal format (e.g., the number of symbols occupied by each SL signal or the number of subframes used in transmission of one SL signal), signal strength from the BS, transmit power strength of an SL UE, or the like.

Hereinafter, a resource allocation in sidelink will be described.

Figure 13:
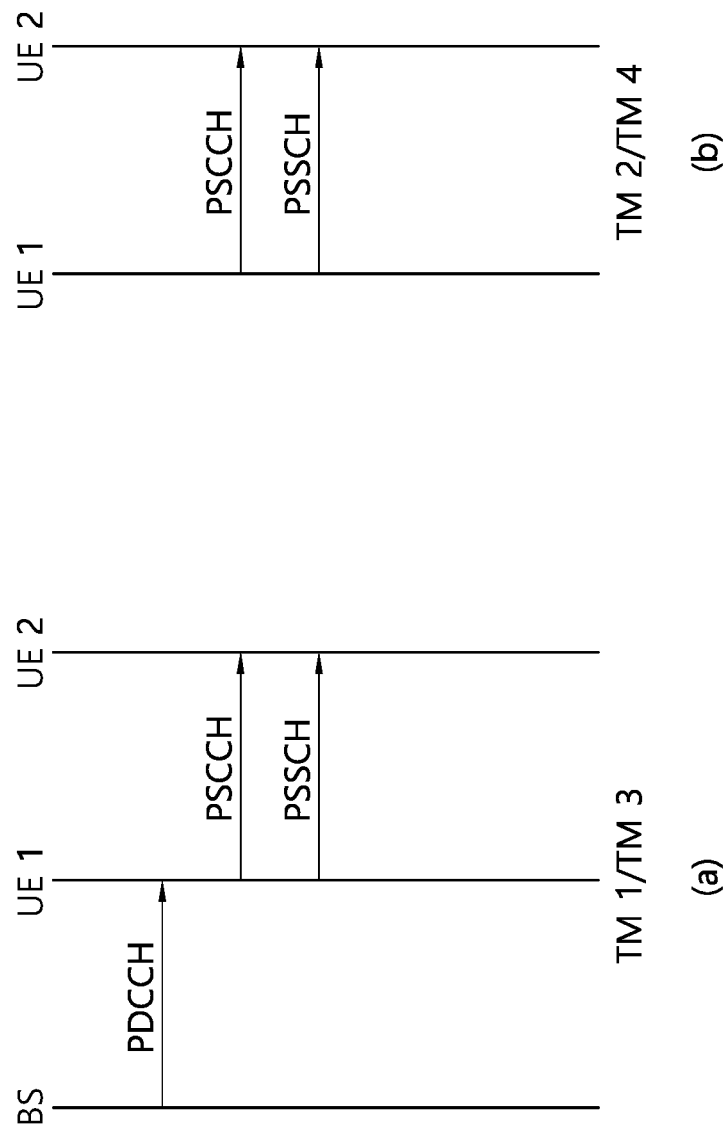
FIG. 13 shows exemplary UE operations according to a transmission mode (TM) related to V2X/D2D in accordance with an embodiment of the present disclosure.

FIG. 13 shows exemplary UE operations according to a transmission mode (TM) related to V2X/D2D in accordance with an embodiment of the present disclosure. (a) of FIG. 13 shows UE operations related to Transmission mode 1 or Transmission mode 3, and (b) of FIG. 13 shows UE operations related to Transmission mode 2 or Transmission mode 4.

Referring to (a) of FIG. 13, in Transmission modes 1/3, the base station performs resource scheduling to UE 1 through a PDCCH (more specifically, DCI), and UE 1 performs sidelink/V2X communication with UE 2 in accordance with the corresponding resource scheduling. After transmitting sidelink control information (SCI) to UE 2 through a physical sidelink control channel (PSCCH), UE 1 may transmit data that is based on the SCI through a physical sidelink shared channel (PSSCH). Transmission mode 1 may be applied to sidelink, and Transmission mode 3 may be applied to V2X.

Referring to (b) of FIG. 13, in Transmission modes 2/4 may be modes according to which the UE performs self-scheduling. More specifically, Transmission mode 2 may be applied to sidelink, wherein the UE may select a resource by itself from a configured resource pool and perform sidelink operations. Transmission mode 4 may be applied to V2X, wherein, after performing sensing/SA decoding processes, and so on, the UE may select a resource by itself from a selection window and may then perform V2X operations. After transmitting SCI to UE 2, UE 1 may transmit data that is based on the SCI through the PSSCH. Hereinafter, the term Transmission mode may be abbreviated as Mode.

In case of NR sidelink, at least two types of sidelink resource allocation modes may be defined. In case of Mode 1, the base station may schedule sidelink resources that are to be used for sidelink transmission. In case of Mode 2, the user equipment (UE) may determine a sidelink transmission resource from sidelink resources that are configured by the base station/network or predetermined sidelink resources. The configured sidelink resources or the predetermined sidelink resources may be a resource pool. For example, in case of Mode 2, the UE may autonomously select a sidelink resource for transmission. For example, in case of Mode 2, the UE may assist (or help) sidelink resource selection of another UE. For example, in case of Mode 2, the UE may be configured with an NR configured grant for sidelink transmission. For example, in case of Mode 2, the UE may schedule sidelink transmission of another UE. And, Mode 2 may at least support reservation of sidelink resources for blind retransmission.

Procedures related to sensing and resource (re-)selection may be supported in Resource Allocation Mode 2. The sensing procedure may be defined as a process decoding the SCI from another UE and/or sidelink measurement. The decoding of the SCI in the sensing procedure may at least provide information on a sidelink resource that is being indicated by a UE transmitting the SCI. When the corresponding SCI is decoded, the sensing procedure may use L1 SL Reference Signal Received Power (RSRP) measurement, which is based on a Demodulation Reference Signal (SL DMRS). The resource (re-)selection procedure may use a result of the sensing procedure in order to determine the resource for the sidelink transmission.

Figure 14:
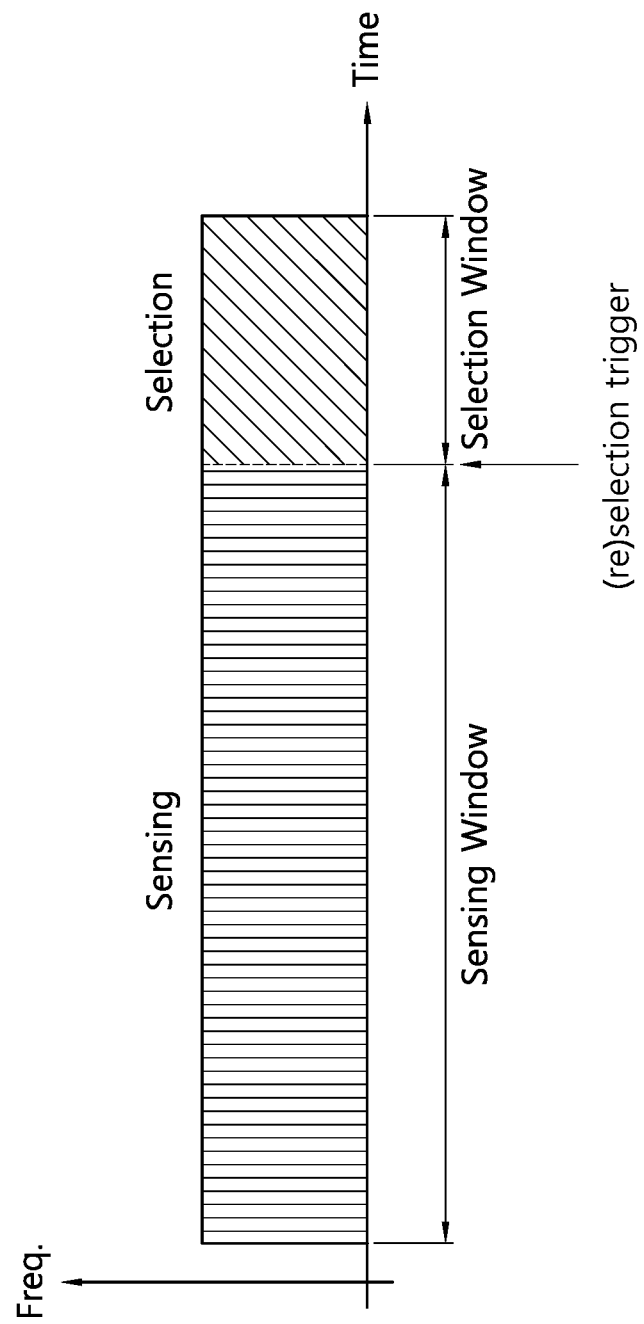
FIG. 14 shows an example of a selection of transmission resources in accordance with an embodiment of the present disclosure.

FIG. 14 shows an example of a selection of transmission resources in accordance with an embodiment of the present disclosure.

Referring to FIG. 14, by performing sensing within a sensing window, the UE may determine transmission resources reserved by another UE or transmission resources being used by another UE, and, after such transmission resources are excluded from the selection window, among the remaining resources, the UE may randomly select resources from resources having little interference.

For example, within the sensing window, the UE may decode the PSCCH including information on the cycle periods of the reserved resources and may measure PSCCH RSRP from the periodically determined resources based on the PSCCH. The UE may exclude resources having the PSSCH RSRP that exceeds a threshold value from the selection window. Thereafter, the UE may randomly select sidelink resources from the remaining resources within the selection window.

Alternatively, the UE may measure Received signal strength indication (RSSI) of the periodic resources within the sensing window, so as to determine resources having little interference (e.g., resources corresponding to the lower 20%). And, among the periodic resources, the UE may randomly select sidelink resources from the resources included in the selection window. For example, in case the UE fails to perform decoding of the PSCCH, the UE may use the above-described method.

Hereinafter, a hybrid automatic repeat request (HARQ) procedure will be described.

An error compensation scheme for securing communication reliability may include a Forward Error Correction (FEC) scheme and an Automatic Repeat Request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme and it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

When the SL HARQ feedback may be enabled for unicast, in a non-code block group (non-CBG) operation, if the receiving UE successfully decodes a transport block, the receiving UE may generate HARQ-ACK. In addition, the receiving UE may transmit the HARQ-ACK to the transmitting UE. If the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

When the SL HARQ feedback may be enabled for groupcast, the UE may determine whether to transmit HARQ feedback based on a transmission-reception (TX-RX) distance and/or RSRP. In the non-CBG operation, two HARQ feedback options may be supported for groupcast.

(1) Option 1: After the receiving UE decodes an associated PSCCH, if the receiving UE fails to decode the corresponding transport block, the receiving UE may transmit an HARQ-NACK over the PSFCH. Otherwise, the receiving UE may not transmit a signal on the PSFCH.

(2) Option 2: If the receiving UE successfully decodes the corresponding transport block, the receiving UE may transmit an HARQ-NACK on the PSFCH. After the receiving UE decodes an associated PSCCH targeting the receiving UE, if the receiving UE fails to successfully decode the corresponding transport block, the receiving UE may transmit an HARQ-NACK on the PSFCH.

In case of Resource Allocation Mode 1, a time between the HARQ feedback transmission on the PSFCH and the PSSCH may be (pre-)configured. In case of unicast and groupcast, if retransmission is needed in the sidelink, this may be indicated, to the base station, by a UE existing within a coverage using a PUCCH. The transmitting UR may also transmit an indication to a service base station of the transmitting UE in the form of a Scheduling Request (SR)/Buffer Status Report (BSR) and not in the form of an HARQ ACK/NACK. Additionally, even if the base station does not receive the indication, the base station may schedule a sidelink retransmission resource to the UE.

In case of Resource Allocation Mode 2, a time between the HARQ feedback transmission on the PSFCH and the PSSCH may be (pre-)configured.

Hereinafter, the proposals of the present disclosure will be described in more detail.

The following drawings are prepared for describing one specific example of the present disclosure. A name of a specific device or a name of a specific signal/message/field disclosed in the drawings is exemplarily presented, so a technical feature of the present disclosure is not limited to a specific name used in the following drawings.

The present disclosure provides a method in which a driver status monitoring device or surrounding vehicles sense a status of a driver and/or a vehicle in which abnormality occurs upon driving, and a corresponding vehicle in which the abnormality occurs also announces the information to the surrounding vehicle, a network, or a related organization through a V2X communication device to prevent an accident or control the vehicle in which the abnormality occurs.

Specifically, causes for the occurrence of abnormalities in the vehicle operation may be generally divided into the abnormality of the driver and a defect of the vehicle itself. A driver monitoring device such as driver status monitoring (DSM) for sensing the abnormality of the driver among the causes or various vehicular diagnostic tools for sensing the defect of the vehicle may be used. The method proposed in the present disclosure relates to a method for transmitting information acquired from the device, the tool, etc., to the surrounding vehicle, the network, and the related organization through the V2X communication device, and is to prevent even a secondary accident which may occur when the information is processed only in the vehicle.

Various devices including devices for safety and convenience, such as accident prevention exist in the vehicle. The devices are used for protecting a vehicle in which the corresponding devices are installed from the surrounding vehicle, an environment, a pedestrian, etc., but the surrounding vehicles may have devices which are the same thereas or similar thereto, and the devices may also perform the same function.

Another method proposed in the present disclosure based on such a principle relates to a scheme that acquires comprehensive information for one target vehicle by combining vision information, sensor data, and communication messages sensed by surrounding vehicles of a specific vehicle, and a method that may effectively use, in a situation in which the specific vehicle continuously travels while sensing and collecting information of the surrounding vehicle, the environment, and the pedestrian, the information.

As an example, when a vehicle does not exist around the specific vehicle within a predetermined range or there are a small number of surrounding vehicles, it may be difficult to acquire information on a target vehicle, but instead, a collision risk is reduced, and as a result, a probability of an accident may also be reduced.

On the contrary, when a lot of vehicles exist around a specific vehicle in which the abnormality occurs within a predetermined range, the collision risk may increase, but a lot of vehicles and the resulting larger number of devices, and sensors for sensing an abnormal status of the corresponding vehicle exist, and as a result, it may be easier to prevent the accident.

As an example, in order to sense the abnormal status of the driver, a driver status monitoring (DSM) device constituted by a camera, a sensor, etc., may be installed in the vehicle. Likewise, a device for sensing an abnormal status of a passenger including the driver, i.e., a cabin status monitoring (CSM) device may also be installed in the vehicle, and this may also be a device including the DSM device. The DSM and CSM devices may warn the driver to allow the driver to return to a normal drivable status, but the driver may not return to the normal drivable status. Accordingly, in spite of the vehicle in which the device is installed, the device does not just warn the diver inside the vehicle, but when the abnormal status is sensed, the abnormal status may be announced to the surrounding vehicle, the network, or the related organization through the V2X communication device. The surrounding vehicle may avoid the corresponding vehicle in which the abnormality occurs, and the vehicle in which the abnormality occurs may also be controlled with a motion of the vehicle under autonomous judgment or by receiving a V2X message from the surrounding vehicle or the network.

However, the DSM device capable of sensing the driver status may not be installed in all vehicles. For example, in an autonomous driving vehicle, it may be more natural for the vehicle to autonomously drive the vehicle than to force the driver to wake up and return to vehicle driving by utilizing the DSM device. Alternatively, in the case of a connected car in which vehicle communication such as V2X communication is possible, it may be more appropriate to share information on the status of the vehicle, and transmit appropriate messages and commands through V2V direct communication and/or a communication network.

Therefore, in addition to the scheme that avoids the accident risk in the vehicle alone, the present disclosure proposes a scheme that recognizes the accident risk through sensing information of the surrounding vehicle and propagates the accident risk to the surrounding vehicle, the network, etc., to avoid even a risk of a secondary accident. To this end, proposed is a method in which when various devices for avoiding the accident risk in the vehicle alone, e.g., the devices such as the DSM/CSM device that checks whether the driver sleeps or a health status of the/driver/passenger are installed, information collected by the corresponding device is propagated to surroundings.

Further, if there is no particular device which may warn the driver in a vehicle in which the DSM device is not installed, it may be difficult for the driver to return to a normal driving mode, and further, there may be abnormality in a vehicle operation status. As such, when a cause of the vehicle abnormality is not solved early, a method for sensing the vehicle abnormality and propagating the vehicle abnormality to the surroundings by the surrounding vehicles is proposed.

Specifically, hereinafter, DSM-based driver anomaly detection and propagation method will be described.

When the DSM device exists, it is judged that a driving status (e.g., drowsy driving, distracting behavior, etc.) of the driver in the vehicle is not good or the health status (e.g., unstable heart rate, breathing detection, etc.) is not good, the vehicle driven by the driver in the vehicle delivers a warning message or stimuli, such as a visual, auditory, tactile, etc., to the driver for each step to request driving return to the driver. Further, when it is determined that the health status of the driver and the passenger is not also good or is not suitable for vehicle boarding through the CSM device, the vehicle may deliver the warning message or the stimuli such as the visual, the auditory, the tactile, etc., to the corresponding passenger or driver. The DSM and CSM devices may examine the status of the passenger and judge whether the status of the passenger influences safe driving as follows, and transmit a corresponding measurement/judgment result to the surrounding vehicle/network.

Eye tracking examination: as a scale to examine a drowsy driving degree (e.g., fatigue, drowsiness, deep sleep, etc.), a fatigue degree, etc., of the driver, is capable of examining the drowsy driving degree based on the following elements.

1. Size of eye: When the drowsiness occurs, the eye is closed (i.e., the size of the eye decreases) while eyelids droop down as a largest feature. A status in which the size of the eye decreases may be a status in which eyes are kept forward and as a presymptom of the drowsy driving even though the driver is not actually in a sleep status, concentration is significantly impaired, and as drowsiness becomes severe, it may be more difficult to open the eyes. Accordingly, a ratio for how the size of the eye is reduced as compared with the size of the eye in a normal status may be checked, and more specifically, when the ratio decreases to a predetermined value or less (e.g., 0.5 times as large as the size of the eye in the normal status), it may be judged that there is a risk of the drowsy driving.

2. Time and/or frequency of closing eyes: While the size of the eye decreases, a phenomenon in which the eye is temporarily closed and the eye is opened again may be repeated. However, even though the eye is closed for a brief moment, a very large influence may be exerted on actual driving. For example, when the eye is closed for 0.5 seconds at 72 km/h, 10 m may be traveled in any undesired direction. Accordingly, it may check whether a phenomenon in which the eye is closed by drowsiness other than blinking the eye, and more specifically, it is examined for how long the eye is closed and how often the eye is closed again, and when an eye closing time increases (e.g., 0.5 seconds or more) or the eye is frequently closed (e.g., once within 10 seconds), it may be judged that there is the risk of the drowsy driving.

3. Keep eye forward degree: Even when the eye is not kept forward due to the drowsiness or the eye is not kept due to another reason, there is the same risk as the drowsy driving. Accordingly, when the eye is not kept forward for a predetermined time or more during traveling (e.g., 0.5 seconds), it may be judged that dangerous driving is performed.

Health monitoring examination: as a scale capable of examining a situation in which an association with an emergency medical institution due to treatment center due to a heart problem, unstable breathing, seizure, stunning, shock, etc., in which a surrounding vehicle or a network receiving a flag related thereto may transmit a related message to a surrounding emergency medical institution, and allow the corresponding institution to track the statuses of the corresponding vehicle and the corresponding driver.

Further, an in-vehicle sensor, an ADAS device, etc., may examine the driving status by the following method.

Steering (traversal variation): In a steering related abnormal operation situation, the vehicle may examine traffic lane alignment through an ADAS camera, etc., and judge whether abnormal steering is made. When it is judged that the abnormal steering is made, the vehicle propagates such a sensing result to the surrounding vehicle, while the surrounding vehicles of the vehicle need to change a traffic lane or adjust a driving speed in order to prevent a collision with the corresponding vehicle. More specifically, the vehicle may measure at which location the vehicle is in the traffic lane or how far the vehicle deviates from a center of the traffic lane horizontally through the ADAS camera. Of course, it is very nearly impossible that the center of the vehicle and the center of the traffic lane match 100% and the vehicle cannot but travel while being swung horizontally by a predetermined amount or being leaned to one side. When the vehicle deviates to a left side or a right side from the center so much (e.g., 1.5 m), it may be determined that the abnormal steering is made, and a dangerous driving status may also be discriminated according to for how long the abnormal steering is continued or how often the abnormal steering occurs. An example of the steering related abnormal operation situation is described below.

1. Abnormal traffic lane leaning phenomenon: When the driver deviates from a steering wheel, i.e., when the vehicle is not operated by holding the steering wheel, the vehicle is not accurately positioned at the center of the traffic lane, but the vehicle may be excessively leaned to a left or right part of the traffic lane. Alternatively, even when the driver holds the steering wheel, the same result may be caused if the driver is unconscious or performs drowsy driving. However, since such a phenomenon is a phenomenon which may appear in the case of an inexperienced driver, it is necessary to be careful of judgment. Meanwhile, when the abnormal traffic lane leaning phenomenon is continued due to the abnormality of the driver, even an abnormal traffic lane occupation or traffic lane deviation result may be caused.

2. Abnormal traffic lane occupation phenomenon: When the abnormal traffic lane leaning phenomenon is continued as described above, the vehicle may deviate from the traffic lane without a turn indicator or without an intention of a change of the traffic lane, or the vehicle may be driven throughout multiple traffic lanes for a predetermined time or more.

3. Phenomenon in which vehicle is operated while stumbling horizontally: When normal operation is not performed as the driver intends, the vehicle may not move toward the traffic lane, but may be operated while stumbling horizontally. As an example, operation trajectory information of a normal vehicle which is a vehicle normally operated for a specific section (e.g., a segment section of a road or a section for a predetermined past section from a current time point of a target vehicle) and operation trajectory information of an abnormal vehicle are compared and when a change amount of an error for each point is equal to or more than a threshold, it may be judged that an abnormal operation is made. Here, as an example, the predetermined section may be 100 m. Further, here, as an example, the threshold may be 1.5 m.

Acceleration or deceleration: In a situation described below, the vehicle may measure the acceleration or the deceleration from an accelerometer or GPS.

1. Abnormal acceleration: In a case where the abnormal vehicle is accelerated at a threshold acceleration or more in a situation in which constant speed or deceleration driving is required in a traffic flow, the case may be regarded as an abnormal acceleration situation. When a preceding vehicle of the abnormal vehicle recognizes the abnormal acceleration situation, the preceding vehicle needs to attempt increasing a speed or the traffic lane change for a collision.

2. Abnormal deceleration: In a case where the abnormal vehicle attempts sudden stop at a threshold deceleration or more in a situation in which a traffic flow is smooth, the case may be regarded as an abnormal deceleration situation. When a trailing vehicle of the abnormal vehicle recognizes the abnormal deceleration situation, the trailing vehicle needs to attempt decreasing a speed or the traffic lane change for prevention of the collision.

Meanwhile, the abnormal vehicle may transmit status information of the driver or the passenger and furthermore, driving status information of the vehicle which may be influenced thereby to the surrounding vehicle or the network through a V2X message in the following form.

Cooperative awareness message (CAM) or CAM-extension: The status of the passenger, the status of the vehicle, etc., may be periodically reported to the surrounding vehicle and/or the network.

Decentralized environmental notification message (DENM): When a serious problem may occur in the status of the passenger and the status of the vehicle, the DENM may be transmitted. The DENM may be a message transmitted when an event occurs. As an example, in a case where the status of the driver does not return to a normal status even after a predetermined time point or remains to a pre-defined reference time or less up to a time-to-collision (TTC), the abnormal vehicle may announce the case to the surrounding vehicles and/or the network through the DENM.

Separate message: The status of the passenger or the vehicle may be transmitted through a separate message, as an example, a dedicated message such as a driver status message (DSM) or a cabin status message (CSM). The message may be periodically transmitted or transmitted when a specific event occurs.

Figure 15:
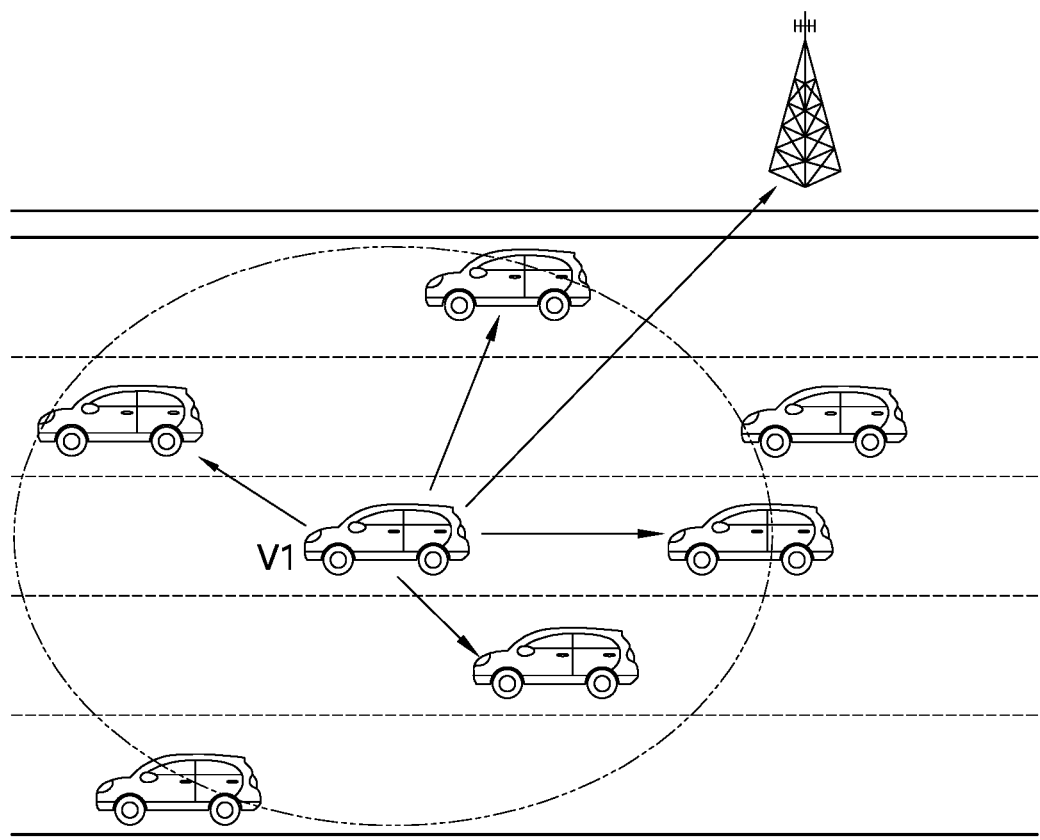
FIG. 15 schematically illustrates an example of a method for detecting and propagating an abnormal state of a driver based on DSM according to some implementations of the present disclosure.

FIG. 15 schematically illustrates an example of a method for detecting and propagating an abnormal state of a driver based on DSM according to some implementations of the present disclosure.

For example, according to FIG. 15, a DSM device may be installed in the abnormal vehicle V1. Here, the DSM device in V1 may detect an abnormal state of the driver of V1. Specific examples of the abnormal state and the detection of the abnormal state are the same as described above, and thus a redundant description will be omitted.

As another example, according to FIG. 15, a sensor, an ADAS device, etc. may be installed in the abnormal vehicle V1. Here, the sensor or the ADAS device in V1 may detect abnormal operation of V1. Specific examples of the abnormal driving state and the detection of the abnormal driving state are the same as described above, and thus a redundant description thereof will be omitted.

Referring to FIG. 15, when the device in V1 detects the abnormal state of the driver of the vehicle V1 and/or the abnormal driving state of the vehicle V1, the vehicle V1 may transmit a message including related information to nearby vehicles and/or network. Since a specific example of message transmission is the same as described above, a redundant description will be omitted.

Hereinafter, vehicle abnormality detection method based on detection information of surrounding vehicles will be described.

If the DSM device is not installed inside the vehicle, the driver status of the vehicle may not be judged. Further, even though the DSM device is installed, DSM information may not derive a result reliably or rapidly enough to prevent an accident of a target vehicle or a secondary accident.

When abnormality occurs in a driver of a specific vehicle, the abnormality also occurs even in operating the specific vehicle, and when such a situation is continued or a degree is severe, surrounding vehicles of the specific vehicle may discover the situation. Here, external sensors, ADAS devices, etc., of the surrounding vehicles may check a driving status of a specific vehicle by the following scheme.

Steering (traversal variation): As an example, a surrounding vehicle of an abnormal vehicle may examine traffic lane alignment through an ADAS camera, etc., and judge whether abnormal steering is made. When it is judged that the abnormal steering is made, the surrounding vehicle transmits such a sensing result to the abnormal vehicle and the surrounding vehicles, while the surrounding vehicles of the abnormal vehicle including the surrounding vehicle may change a traffic lane or adjust a driving speed in order to prevent a collision with the corresponding vehicle. More specifically, the surrounding vehicle may measure at which location the abnormal vehicle is in the traffic lane in addition to the surrounding vehicle or how far the surrounding vehicle deviates from a center of the traffic lane horizontally through the ADAS camera. It is difficult for the center of the abnormal vehicle and the center of the traffic lane to completely match, and the abnormal vehicle may be driven while being swung horizontally by a predetermined amount or leaned to one side, but when the abnormal vehicle excessively deviates from the center horizontally (e.g., when the abnormal vehicle deviates from the center of the traffic lane by 1.5 m or more), it may be judged that the abnormal steering is made, and an abnormal driving status may also be judged according to for how long the abnormal steering is continued or how often the abnormal steering occurs. When the following phenomena occur, the corresponding vehicle may be judged as the abnormal vehicle.

1. Abnormal traffic lane leaning phenomenon: The surrounding vehicle judges that a traffic lane leaning phenomenon occurs because the driver of the abnormal vehicle is unskilled in driving or a problem occurs in the driver status to measure the abnormal traffic lane leaning phenomenon. When the phenomenon is continued due to the abnormality of the driver, an abnormal traffic lane occupation phenomenon and/or a traffic lane deviation phenomenon may also be caused.

2. Abnormal traffic lane occupation phenomenon: When the abnormal traffic lane leaning phenomenon is continued, the vehicle may deviate from the traffic lane without a turn indicator or without an intention of a change of the traffic lane, or the vehicle may be driven throughout multiple traffic lanes for a predetermined time or more.

3. Phenomenon in which vehicle is operated while stumbling horizontally: When normal operation is not performed as the driver intends, the vehicle may not move straight toward the traffic lane, but may be operated while stumbling horizontally. As an example, with respect to a specific vehicle, operation trajectory information of the specific vehicle normally operated for a specific section (e.g., a specific section of the road or a predetermined past section from a current point for the specific vehicle) and the operation trajectory information of the abnormal vehicle are compared and when a change amount of an error for each point is equal to or more than a threshold, it may be judged that the abnormal operation is made. Here, as an example, the operation trajectory information of the abnormal vehicle may be acquired through reception of the BSM and the threshold may be 1.5 m.

Acceleration/deceleration (longitudinal variation): The surrounding vehicle of the abnormal vehicle may measure or calculate the acceleration/deceleration from the V2X message received from the accelerometer or the abnormal vehicle, and observe the following phenomena.

1. Abnormal acceleration phenomenon: In a case where the abnormal vehicle is accelerated at a predetermined acceleration or more in a situation in which constant speed driving or deceleration driving is required in a traffic flow, the case may be regarded as an abnormal acceleration situation. When a preceding vehicle of the abnormal vehicle recognizes the abnormal acceleration situation, the preceding vehicle need to attempt increasing a speed or the traffic lane change for a collision.

2. Abnormal deceleration phenomenon: In a case where the abnormal vehicle attempts sudden stop at a predetermined deceleration or more in a situation in which a traffic flow is smooth, the case may be regarded as an abnormal deceleration situation. When a trailing vehicle of the abnormal vehicle recognizes the abnormal deceleration situation, the trailing vehicle need to attempt decreasing a speed or the traffic lane change for prevention of the collision.

When the above-described situations occur, the surrounding vehicle may deliver a warning message to the abnormal vehicle or perform an attempt for releasing a dangerous situation. An example of a motion of the surrounding vehicle is as follows.

1. Transmission of warning message to abnormal vehicle: The abnormal vehicle is recognized and designated through a user interface (UI) with which the ADAS camera, etc., interlocks to transmit the V2X message to the abnormal vehicle. The V2X message may be transmitted even to the surrounding vehicle and/or the network by a broadcast scheme. As an example, a specific field of the V2X message including corresponding information may include information capable of announcing the target vehicle. Here, the warning message may be CSM or DSM.

When an identifier (ID) for the abnormal vehicle is acquired, the ID value may be designated, and information on a measurement time point and a measurement point may also be included in the V2X message in a form of a trajectory or a path history. A vehicle that receives the V2X message may judge that the vehicle itself is indicated as the abnormal vehicle by comparing a path history thereof and received information. The abnormal vehicle that receives the message may announce the warning message to the driver through the UI, etc., and furthermore, allow the driver to recognize that the dangerous situation occurs through a sound, an image, etc., related to a warning inside the vehicle.

As an example, in addition to a driver which has no problem in health and consciousness, a driver which has no sense for the traffic lane or an inexperienced driver may travel while stumbling horizontally or travel while being leaned to the left side or the right side of the traffic lane. In this case, when a diagnosis result for the abnormal vehicle and/or an abnormal operation is shown in the UI of an observed vehicle, a diagnosis result for a driving status may be transmitted to the other vehicle only by pressing a button in the UI related to a corresponding event.

2. Physical warning to target vehicle: When it is judged that the abnormal vehicle performs dangerous traveling without sensing the dangerous situation, a surrounding vehicle that senses the corresponding situation may attempt allowing the abnormal vehicle to recognize the dangerous situation while sounding a car horn or blinking a car light (e.g., a high beam).

3. Transmission of warning message to surrounding vehicle, infrastructure, and network: When the abnormal vehicle may autonomously diagnose the dangerous situation, the abnormal vehicle may transmit the corresponding information to the surrounding vehicle, the infrastructure, and the network through a probe vehicle data (PVD) message, etc. On the contrary, when the abnormal vehicle may not autonomously diagnose the dangerous situation, the surrounding vehicle may diagnose the dangerous situation of the abnormal vehicle. As an example, since V2V communication coverage of the abnormal vehicle and V2V communication coverage of a vehicle which travels around the abnormal vehicle may almost match, an effect of transmission of the status message for the abnormal vehicle of the surrounding vehicle may be almost the same as that when the abnormal vehicle autonomously transmits the status message. As an example, since the operation of the abnormal vehicle may be performed like a random motion, a specific vehicle operated around the abnormal vehicle may transmit a warning message for preventing accesses of the surrounding vehicles and announcing being careful, and transmit the same warning message to the infrastructure and the network in order to deliver the warning message to trailing vehicles outside communication coverage of the specific vehicle.

Meanwhile, the surrounding vehicle of the abnormal vehicle may transmit status information of the driver or the passenger and furthermore, status information of the vehicle which may be influenced thereby to other surrounding vehicles or the network through a V2X message in the following form.

CAM or CAM-extension: The status of the observed vehicle may be periodically reported to the surrounding vehicle and/or the network.

DENM: When a serious problem may occur in the status of the passenger in the abnormal vehicle and the status of the abnormal vehicle, a surrounding vehicle that measures the serious problem may transmit the DENM. The DENM may be a message transmitted when an event occurs. As an example, in a case where the status of the abnormal vehicle does not return to a normal status even after a predetermined time point or remains to a pre-defined reference time or less up to a time-to-collision (TTC) of the abnormal vehicle estimated by the surrounding vehicle, the surrounding vehicle may announce the case to other surrounding vehicles and/or the network through the DENM.

Separate message: A surrounding vehicle that observes the status of the abnormal vehicle may transmit information related to the status of the abnormal vehicle through a separate message such as a cooperative-driver status message (C-DSM), etc., for the status of the abnormal vehicle. The message may be periodically transmitted or transmitted when an event occurs.

Figure 16:
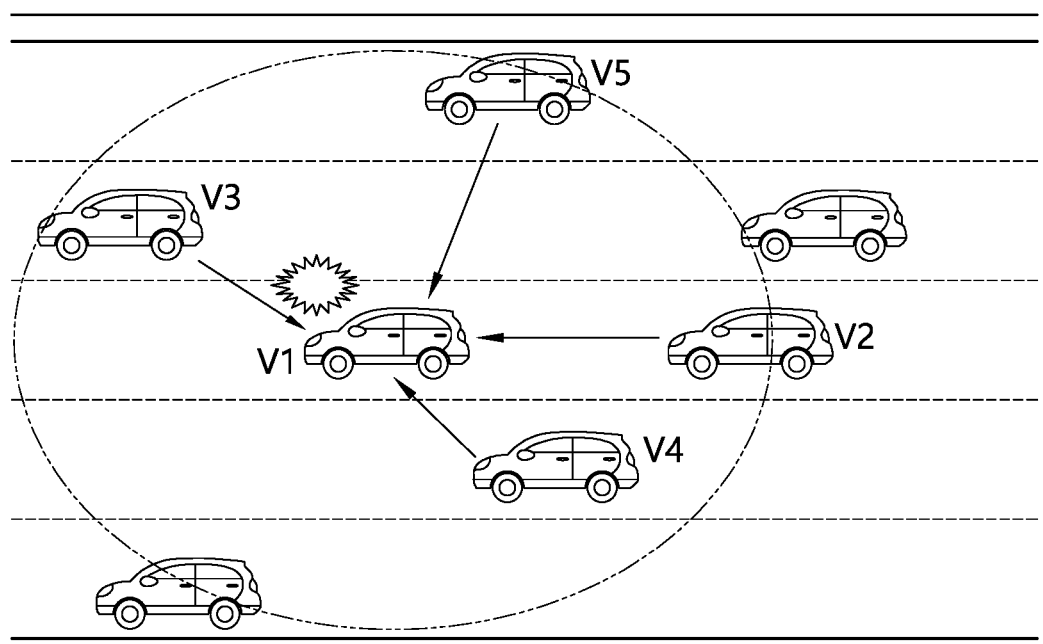
FIG. 16 schematically illustrates an example of a vehicle abnormality detection method based on detection information of surrounding vehicles of the abnormal vehicle according to some implementations of the present disclosure.

FIG. 16 schematically illustrates an example of a vehicle abnormality detection method based on detection information of surrounding vehicles of the abnormal vehicle according to some implementations of the present disclosure.

FIG. 16 assumes a situation in which the abnormal vehicle (e.g., the vehicle operating abnormally) is V1, and surrounding vehicles of the abnormal vehicle are V2, V3, V4, and V5. Each of V2 to V5 may be a vehicle in which an external vehicle sensor and an ADAS device are installed.

Referring to FIG. 16, V2 to V5 may detect a vehicle V1 that is operating abnormally through a vehicle external sensor and an ADAS device. Specific examples of the above operation are the same as described above, and thus a redundant description will be omitted.

Referring to FIG. 16, when V2 to V5 detects abnormal operation of V1, V2 to V5 may transmit a message to V1 to inform that the vehicle V1 is operating abnormally. Furthermore, although not shown in FIG. 16, V2 to V5 may inform other surrounding vehicles and/or network that the vehicle V1 is operating abnormally. Specific examples thereof are the same as described above, and thus overlapping descriptions will be omitted.

Hereinafter, configuration methods of DSM information and vehicle status related messages will be described.

As described above, information acquired from the DSM device or the surrounding vehicles may be transmitted while being included in the conventional V2X message, transmitted while being included in the extended V2X message, or configured as the separate message and transmitted through the V2X device. In this case, a field configuring the message may include a field related to the status of the driver and/or a field related to the status of the vehicle. ID information for the vehicle or message, corresponding vehicle location information, etc., are included in the message and transmitted or derived from another message (e.g., a BSM message transmitted by the corresponding vehicle) or another field of the corresponding message.

As DSM information for the status of the driver, the following types of values may be transmitted selectively or in combination according to motions of the target vehicle and a surrounding vehicle or a network receiving the DSM information.

Raw data for measurement value: A measurement value for data detected by the vehicle may be transmitted. As a specific example, raw data described below may be included.

EXAMPLE 1

Raw Data Related to Status of Driver

As an example, in the case of an eye trajectory value, according to a time, an eye size ratio (ESR) value compared with a normal status is calculated, and as a result, a value during a predetermined time interval is sequentially transmitted according to a section (e.g., a DSM/CSM message transmission period) of acquiring data or a value (as an example, a sample value) acquired at a time of transmitting the corresponding message may be transmitted.

Further, when an event in which the eye is closed occurs, a time interval of closing the eye according to the message transmission period and a time interval value of closing the eye again after returning to a normal status (i.e., an eye opened status) are sequentially transmitted according to a section of acquiring data or a sample value for a confirmed status at the time of transmitting the corresponding message may be transmitted. Here, when the eye closed status is set as an OFF status and an opened status is set to an ON status, the sample may be ON or OFF.

Further, in addition to the eye trajectory value, data collected from other health monitoring related sensors may also be measured and transmitted by the same method as above. For example, information related to a heart rate, whether breathing is performed, etc., may be measured and transmitted.

EXAMPLE 2

Raw Data Related to Driving Status of Target Vehicle

As an example, a value acquired by measuring a steering status may be sequentially transmitted according to a section of acquiring data by measuring a value (e.g., left 0.7 m) resulting from being leaned to left and right sides from a reference value (e.g., a center value of the traffic lane measured from the ADAS camera) for a predetermined time or a value acquired at the time of transmitting the corresponding message may be transmitted.

Alternatively, even as values acquired by measuring acceleration and deceleration statuses, an acceleration value and a deceleration value measured from an ADAS sensor in the vehicle, a GPS value, etc., may be measured for a predetermined time and sequentially transmitted or the value acquired at the time of transmitting the corresponding message may be transmitted.

Risk degree and/or frequency measurement value of abnormal phenomenon: A disk degree derived from data sensed by the vehicle or a statistical value which influences the risk degree may be transmitted. Examples of information described below may be included.

EXAMPLE 1

Information Related to Status of Driver

As an example, in the case of the eye trajectory value, in a case where the eye size ratio (ESR) value compared with the normal status is reduced to a threshold or less, the case may be judged as a drowsy dangerous status and a value (drowsy duration ratio (DDR)) acquired by measuring a ratio of a drowsy dangerous section and the normal section among all measurement sections or all sections may be transmitted. Here, as an example, the threshold may be set to 0.5. Further, here, as an example, when all measurement sections are 1 second, the dangerous section is 0.3 seconds, and the normal section is 0.7 seconds, a DDR value may be 0.43 (=0.3/0.7).

Alternatively, when an event in which the eye is closed occurs, a value (sleep duty ratio (SDR)) acquired by measuring a ratio of a time interval of closing the eye and a time interval of closing the eye again after returning to the normal status (i.e., the eye is opened) or all intervals may be transmitted. As an example, when the time interval of closing the eye is 0.2 seconds and the time interval of closing the eye again after returning to the normal status is 0.8 seconds, the SDR may be 0.25 and the SDR value may be transmitted.

EXAMPLE 2

Information Related to Driving Status

As an example, with respect to the value acquired by measuring the steering status, a value resulting from being leaned to the left side and driven is measured for a predetermined time interval and when the measured value exceeds a left threshold, the corresponding case may be judged as left abnormal steering and when the measured value exceeds a right threshold, the case may be judged as right abnormal steering. Here, a value (Left/Right Steering Error Ratio: LSER/RSER) acquired by measuring a ratio of an abnormal steering interval and the normal interval among all measurement intervals or all intervals may be transmitted. As an example, when all measurement intervals are 1 second and the abnormal steering interval is 0.4 seconds, the normal interval is 0.6 seconds, and as a result, an LSER/RSER value may be 0.67 (=0.4/0.6).

Alternatively, even with respect to the values acquired by measuring the acceleration and deceleration statuses, the acceleration and deceleration values are measured for a predetermined time interval and when the acceleration value exceeds an acceleration threshold, the case may be judged as rapid acceleration and when the deceleration value exceeds a deceleration threshold, the case may be judged as rapid deceleration. Furthermore, a value (Rapid Acceleration/Deceleration Ratio: RAR/RDR) acquired by measuring a ratio of a rapid acceleration/rapid deceleration interval and the normal interval among the all measurement intervals or all intervals may be transmitted. As an example, when all measurement intervals are 1 second and the rapid acceleration/rapid deceleration interval is 0.1 second, the normal interval is 0.9 seconds, and as a result, an RAR/RDR value may be 0.11 (=0.1/0.9).

Information on dangerous zone: The abnormal vehicle senses the abnormality of the driver or the abnormality of the driving status, and as a result, how the abnormal vehicle influences the surrounding vehicle or at which degree neighboring vehicles sense the risk of the accident due to the abnormal vehicle may be estimated. That is, when another vehicle enters such a zone, the corresponding vehicle may judge a location thereof as the dangerous zone. Meanwhile, the information may be generated by the abnormal vehicle itself and transmitted to neighboring vehicles, or may be generated by a neighboring vehicle of the abnormal vehicle and transmitted to other neighboring vehicles. Meanwhile, as an example, the danger radius or danger zone around the abnormal vehicle may be set in the following manner.

(Left separation distance) As an example, when a reference for judging that the vehicle is operated while stumbling horizontally by abnormal steering is s(m), this value (e.g., s=1.5 m) as an offset value from the center of the traffic lane may also be set to the dangerous zone or a value in which the vehicle is actually maximally biased to the left side may also be designated as an offset. In this case, when the center of the vehicle matches a left line (e.g., in the case of a road having a width of 3.5 m, when the vehicle is biased to the left side by 1.75 m), it may be judged that the vehicle is maximally leaned to one direction, and as a result, the corresponding value may also be set as the dangerous zone. More specifically, the dangerous zone may be set to be equal to a value acquired by adding a half of a vehicle width to the value. Further, in the above case, the direction of the vehicle may not be particularly a straight direction and may be twisted from a traffic line direction at any degree of angles. As an example, when the direction of the vehicle is twisted at 90 degrees, the dangerous zone may be equal to not a value acquired by the half of the vehicle width to the offset value as described above, but a value acquired by adding a half of a vehicle length to the offset value.

As an example, when the center of the vehicle matches the left line of the traffic lane (e.g., in the case of the road having the width of 3.5 m, when the vehicle is biased to the left side by 1.75 m), if the vehicle is twisted to the left side in the direction of 90 degrees (e.g., in the case of a 5 m vehicle, if 2.5 m is added to the offset value), a left dangerous zone as large as a total of 4.25 m is expected. When a worst case is considered, a vehicle at the left side may be a vehicle having abnormal steering. When it is assumed that left and right dangerous zones are the same, the left vehicle also has a right dangerous zone of 4.25 m, and when this is considered, a size of the left dangerous zone may be set to 8.5 m (4.25 m*2).

(Right separation distance) As described above, methods which may be applied to the left separation distance may be applied to the right separation distance. As an example, as described above, the size of the right dangerous zone may be set to 8.5 m. Alternatively, when a left steering abnormal status and a right steering abnormal status are different from each other (e.g., when the vehicle is leaned mainly only to the left side), the above, i.e., the dangerous zone size values which are the same at the left and right sides need not particularly applied.

(Front separation distance) As an example, a value of the front separation distance may be determined based on an acceleration size (e.g., 1 m/s2) corresponding to the rapid acceleration, and when a time of approximately 5 seconds is required by considering a message reception and reaction time, a specific vehicle of 20 m/s (72 km/h) (here, when it is assumed that a front vehicle of the specific vehicle also has the same speed) may follow behind the front vehicle by 12.5 m for 5 seconds upon rapid acceleration, as an example. Accordingly, when the value becomes the dangerous zone size of a front direction or in a worst case, when the front vehicle performs the rapid deceleration, the specific vehicle may follow behind the front vehicle by 25 m for 5 seconds. Accordingly, in this case, the size of the front dangerous zone may be set to 25 m (12.5 m*2).

(Rear separation distance) As described above, methods which may be applied to the front separation distance may be applied to the rear separation distance. As an example, as described above, the size of the rear dangerous zone may be set to 25 m. Alternatively, when the rapid acceleration value and the rapid deceleration value are different from each other (e.g., the size of the deceleration or acceleration is larger, the dangerous zone size value need not be particularly applied.

Figure 17:
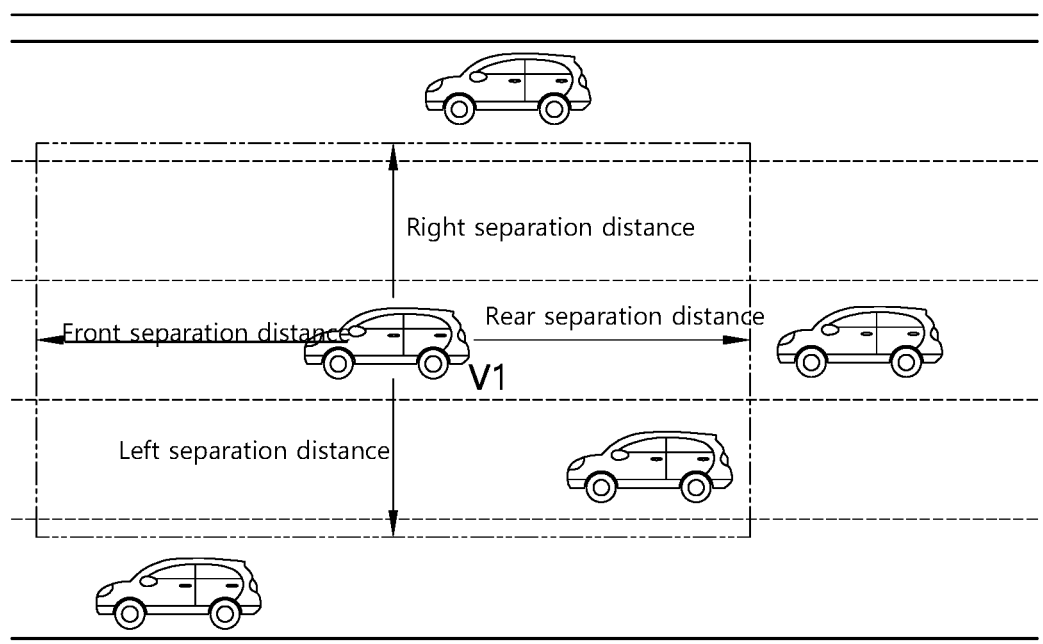
FIG. 17 schematically illustrates an example of a method for setting a danger radius or danger zone according to some implementations of the present disclosure.

FIG. 17 schematically illustrates an example of a method for setting a danger radius or danger zone according to some implementations of the present disclosure.

Referring to FIG. 17, it is assumed that vehicle V1 is detected as an abnormal vehicle. Here, the surrounding vehicle, the RSU, or the base station may acquire information on the speed, the driving direction, and the like for the V1 vehicle. A surrounding vehicle, RSU, or base station may determine a hazardous area (or a danger zone) based on the V1 vehicle based on the information.

After determining the danger zone, the surrounding vehicle, RSU or base station may transmit information about the danger zone to vehicles in the danger zone. Furthermore, information on the danger zone may be transmitted to vehicles adjacent to the danger zone, vehicles scheduled to enter the danger zone, and the like.

Furthermore, the example of FIG. 17 may be applied even when the V1 vehicle itself determines that it is an abnormal vehicle. Specifically, when detecting that the V1 vehicle is operating abnormally through a sensor in the V1 vehicle, the V1 vehicle may transmit related information to a neighboring vehicle, an RSU, and/or a base station.

Figure 18:
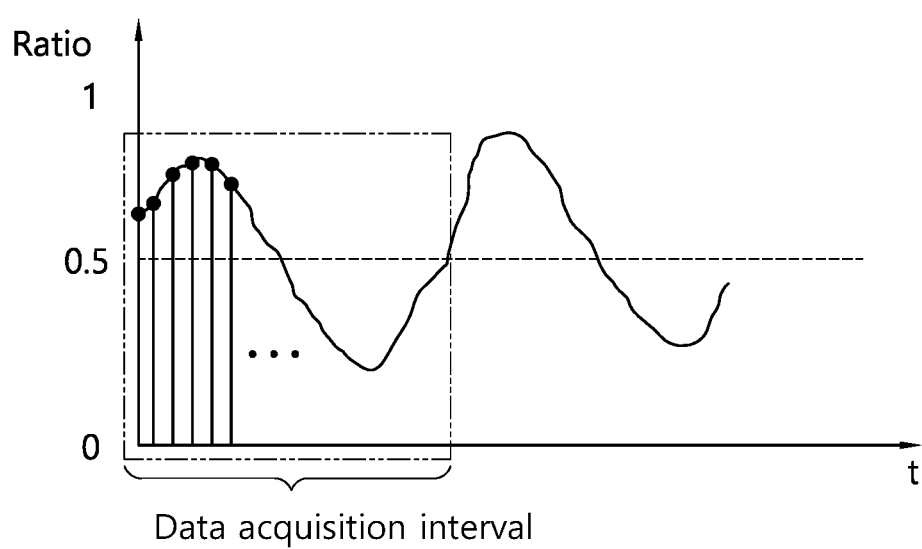
FIG. 18 is for explaining an example of a method of transmitting raw data for a measurement value related to a driver's condition according to some implementations of the present disclosure.

FIG. 18 is for explaining an example of a method of transmitting raw data for a measurement value related to a driver's condition according to some implementations of the present disclosure. Specifically, FIG. 18 schematically shows raw data obtained by measuring the size of a driver's eyes through an in-vehicle DSM device.

Referring to FIG. 18, the DSM device sets the eye size when the eyes are fully opened to 1 and the eye size when the eyes are completely closed to 0, and measures the driver's eye size according to time. Here, the vehicle may measure the size of the eyes for each data acquisition section/period. Here, the length of the data acquisition period may be the same as the transmission period of the CSM message or the DSM message. In addition, the eye size may be measured at a constant period within the data acquisition section. Also, here, the measured value may be included in the DSM message or the CSM message and transmitted.

Figure 19:
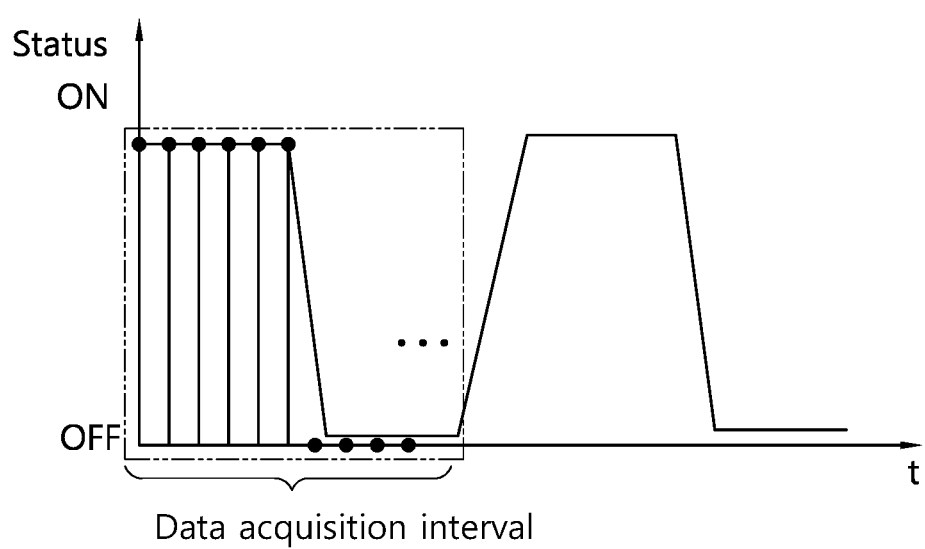
FIG. 19 is for explaining another example of a method of transmitting raw data for a driver's condition related measurement value according to some implementations of the present disclosure.

FIG. 19 is for explaining another example of a method of transmitting raw data for a driver's condition related measurement value according to some implementations of the present disclosure. Specifically, FIG. 19 schematically illustrates raw data obtained by measuring the size of a driver's eyes through an in-vehicle DSM device.

Referring to FIG. 19, the DSM device sets the OFF state when the size of the eye at the measurement time is smaller than 0.5 times compared to the fully opened size, and sets the ON state when it is larger than 0.5 times, and the DSM device can measure the size of the driver's eyes.

Specifically, the DSM device may generate and transmit raw data for the ON state and OFF state within the data acquisition period. Here, the DSM device may measure the size of the eye at a constant period within the data acquisition period. The length of the data acquisition period may be the same as a transmission period of a CSM message or a DSM message. Also, here, the measured raw data may be included in the DSM message or the CSM message and transmitted.

Meanwhile, according to FIG. 19, the raw data for ON state and OFF state is a measured value determined as the ON state or OFF state according to time after setting the eye size when the eyes are fully opened to 1 and the eye size when the eyes are fully closed to 0, like FIG. 18.

Figure 20:
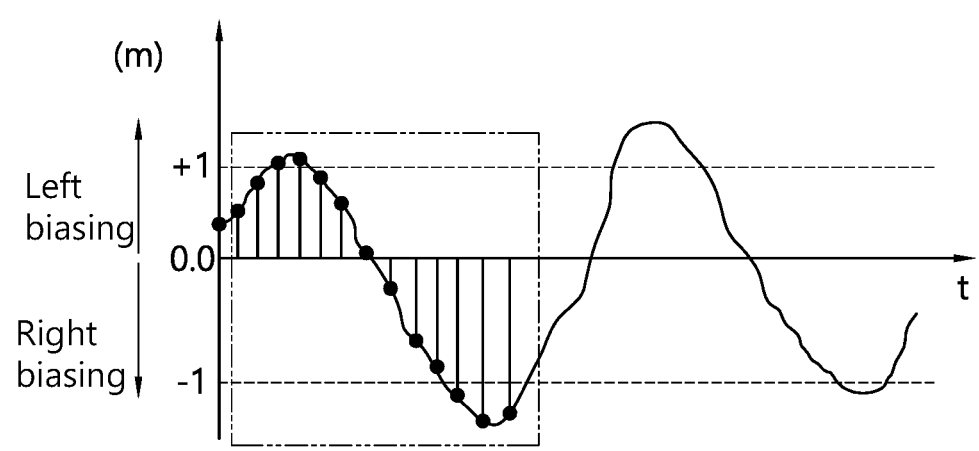
FIG. 20 is for explaining an example of a method of measuring raw data for a measurement value related to a driving state of a vehicle according to some implementations of the present disclosure.

FIG. 20 is for explaining an example of a method of measuring raw data for a measurement value related to a driving state of a vehicle according to some implementations of the present disclosure. Specifically, FIG. 20 is an example of raw data related to a steering state of a vehicle.

Referring to FIG. 20, a steering state of own vehicle or surrounding vehicles may be measured through an in-vehicle sensor. Specifically, the measurement vehicle may measure how far apart the measurement target vehicle is left and right from the center of the lane in which the measurement target vehicle is traveling/driving.

Referring to FIG. 20, based on the driving direction and the driving lane of the measurement target vehicle, 1 m on the left and right, respectively, may be set as a steering threshold and the steering state of the vehicle may be measured. Here, when the measurement target vehicle biasesly drive beyond the steering threshold, the measurement vehicle may transmit a warning message to the measurement target vehicle.

Alternatively, a case of maximally left-biased driving based on the driving direction and driving lane of the measurement target vehicle is set to 1, and a case of driving maximally right-oriented is set to −1, and the steering state of the vehicle may be measured. Here, when the measurement target vehicle enters the left or right lane beyond the driving lane of the measurement target vehicle and drives, a value greater than 1 or less than −1 may be measured.

Figure 21:
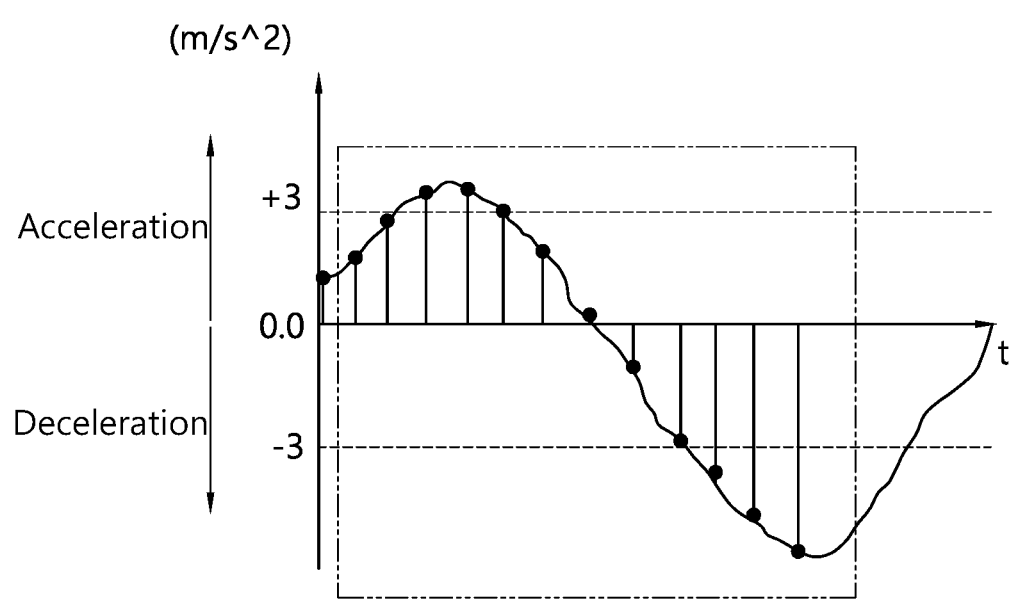
FIG. 21 is for explaining another example of a method of measuring raw data for a measurement value related to a driving state of a vehicle according to some implementations of the present disclosure.

FIG. 21 is for explaining another example of a method of measuring raw data for a measurement value related to a driving state of a vehicle according to some implementations of the present disclosure. Specifically, FIG. 21 is an example of raw data related to acceleration and deceleration of a vehicle.

Referring to FIG. 21, acceleration and deceleration of own vehicle or surrounding vehicles may be measured through an in-vehicle sensor. Specifically, the measurement vehicle sets the acceleration threshold of the measurement target vehicle to 3 m/s$^2$ and the deceleration threshold of −3 m/s$^2$ based on the driving direction of the measurement target vehicle, respectively, and may measure the acceleration and deceleration of the measurement target vehicle. Here, when the acceleration of the measurement target vehicle exceeds the acceleration threshold (rapid acceleration) or the deceleration of the measurement target vehicle is less than the deceleration threshold (rapid deceleration), the measurement target vehicle sends a warning message to the measurement vehicle to notify the rapid acceleration/deceleration.

Figure 22:
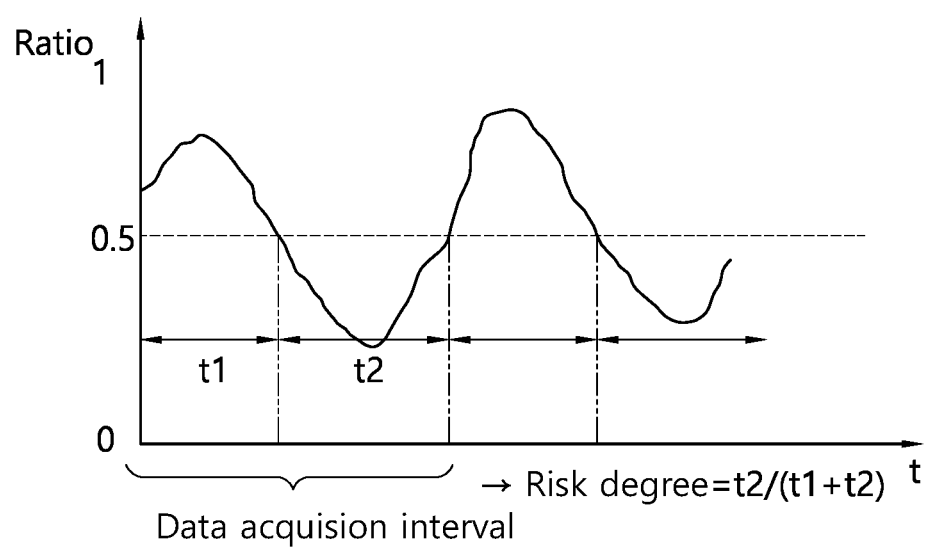
FIG. 22 schematically illustrates an example of a method of measuring the risk degree of anomaly according to some implementations of the present disclosure.

FIG. 22 schematically illustrates an example of a method of measuring the risk degree of anomaly according to some implementations of the present disclosure. Specifically, FIG. 22 is an example of risk measurement based on the size of the eye.

Referring to FIG. 22, the in-vehicle DSM device sets the eye size when the eyes are fully opened to 1 and the eye size when the eyes are completely closed to 0, and may measure the driver's eye size according to time. Here, the vehicle may measure the size of the eyes for each data acquisition section. In addition, the eye size may be measured at a constant period within the data acquisition section.

Referring to FIG. 22, when the threshold related to the size of the eye is 0.5, in the data acquisition period, the measured eye size is greater than the threshold in the t1 time period, and the measured eye size is smaller than the threshold in the t2 time period. In this case, the risk of anomaly may be calculated as t2/(t1+t2).

Here, the length of the data acquisition period may be the same as the transmission period of the CSM message or the DSM message. Also, here, the calculated risk may be included in the DSM message or the CSM message and then transmitted.

Figure 23:
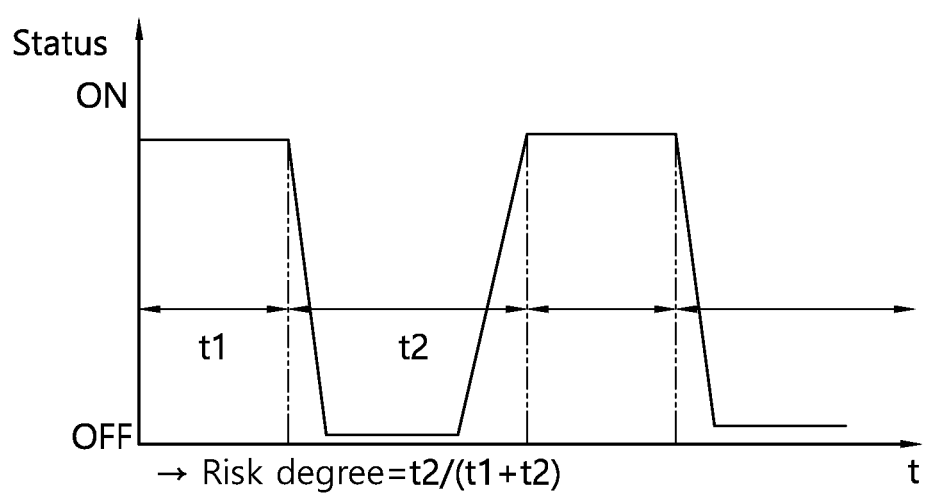
FIG. 23 schematically illustrates another example of a method of measuring the risk of anomaly according to some implementations of the present disclosure.

FIG. 23 schematically illustrates another example of a method of measuring the risk of anomaly according to some implementations of the present disclosure. Specifically, FIG. 23 relates to an eye closing event.

Referring to FIG. 23, the in-vehicle DSM device sets the driver's eye closed state to the OFF state and the driver's eye open state to the ON state, and measures whether or not an eye closing event occurs over time. Here, the vehicle may measure whether an eye closing event occurs in each data acquisition section. In addition, the eye size may be measured at a constant period within the data acquisition section.

Here, when the time period in which the ON state is maintained is t1 and the time period in which the OFF state is maintained is t2 within the data acquisition period, the risk may be calculated as t2/(t1+t2).

Here, the length of the data acquisition section may be the same as the transmission period of the CSM message or the DSM message. Also, here, the calculated risk may be included in the DSM message or the CSM message and transmitted.

Figure 24:
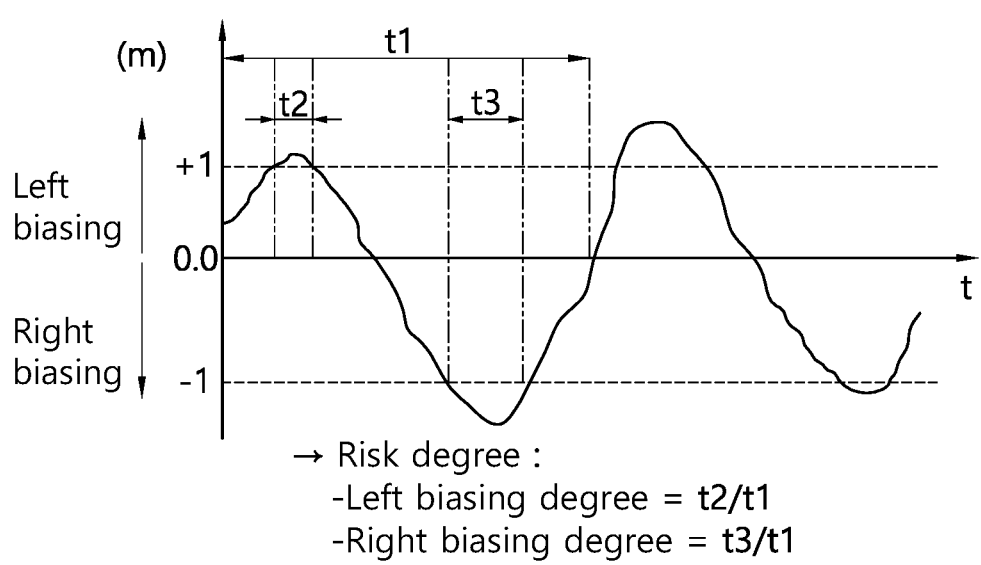
FIG. 24 schematically illustrates an example of a method for calculating the risk of abnormal driving according to some implementations of the present disclosure.

FIG. 24 schematically illustrates an example of a method for calculating the risk of abnormal driving according to some implementations of the present disclosure. Specifically, FIG. 24 relates to biased driving.

Referring to FIG. 24, the measurement vehicle may measure the steering of the measurement target vehicle. In detail, each of 1 m left and 1 m right is set as the steering threshold based on the driving direction and the driving lane of the measurement target vehicle, and the steering state of the vehicle may be measured. Here, when the measurement target vehicle is biasedly driving beyond the steering threshold, it may be determined as abnormal driving.

Referring to FIG. 24, when the entire measurement time duration is t1, the time duration operated in excess of the left-handed threshold within the t1 is t2, and the time duration operated in excess of the right-handed threshold within the t1 is t3, the overall risk of abnormal driving may be calculated as (t2+t3)/t1, the left-biasing or left-biasing risk may be calculated as t2/t1, and the right-handed or right-handed risk may be calculated as t3/t1, respectively.

Figure 25:
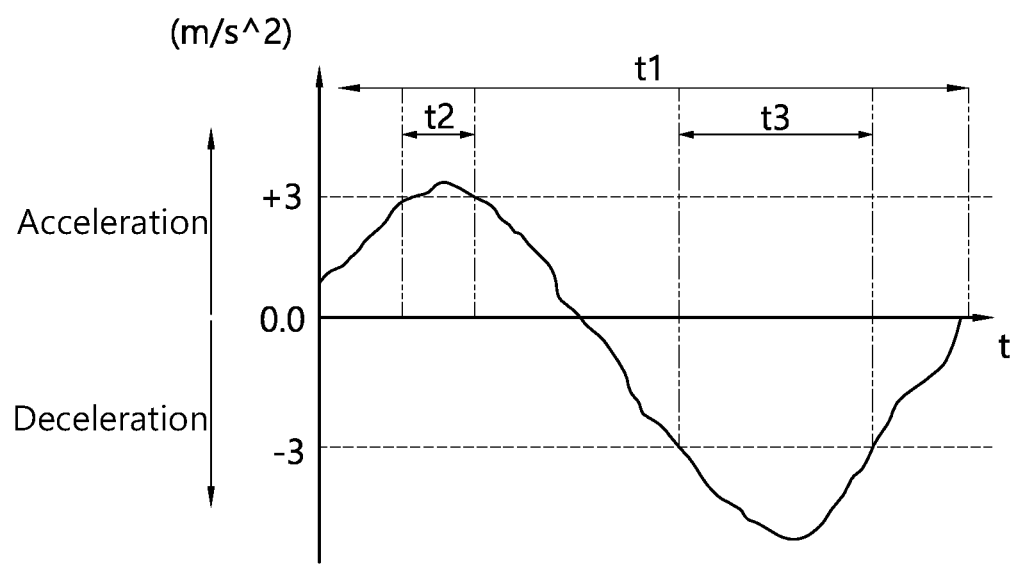
FIG. 25 schematically illustrates another example of a method of calculating the risk degree of abnormal driving according to some implementations of the present disclosure.

FIG. 25 schematically illustrates another example of a method of calculating the risk degree of abnormal driving according to some implementations of the present disclosure. Specifically, FIG. 25 relates to acceleration and deceleration.

Referring to FIG. 25, the measurement vehicle may measure the acceleration and deceleration of the measurement target vehicle. Here, the acceleration threshold may be set to 3 m/s$^2$, and the deceleration threshold may be set to −3 m/s$^2$, respectively.

Here, when the time period in which the measurement vehicle measures the acceleration and deceleration of the measurement target vehicle is t1, the time interval in t1 during which the vehicle to be measured accelerates beyond the acceleration threshold is t2, and the time period in t1 during which the vehicle to be measured decelerates beyond the deceleration threshold is t3, the overall risk degree of abnormal driving may be calculated as (t2+t3)/t1, the rapid acceleration ratio or the rapid acceleration risk degree may be calculated as t2/t1, and the rapid deceleration ratio or the rapid deceleration risk degree may be calculated as t3/t1, respectively.

Meanwhile, the examples of FIGS. 18 to 25 may be applied to the case where the measurement target vehicle and the measurement vehicle are the same or different from each other.

Meanwhile, when there is no particular abnormality in the driver and/or a vehicle to be observed or when in the case of a DSM vehicle, a DSM system in the vehicle judges that the corresponding DSM vehicle and/or a driver of the corresponding DSM vehicle are/is in the normal status, the status message is not periodically transmitted like the conventional V2X BSM message, but the corresponding information is not transmitted or a field for an event flag exists inside a basic container or in a separate DSM container (e.g., a begin part of the DSM message), and as a result, the corresponding field may be set to 0.

Alternatively, when the DSM message is transmitted even though a particular event does not occur in the driver and/or the observed vehicle, the corresponding message may be encrypted in a physical channel end or a higher end so as to be confirmed only by permitted users. Alternatively, when there is no particular abnormality in the driver, the DSM message may be transmitted only by a request of the other person. In this case, as an example, a DSM event flag may be set as 111.

The DSM related data may be included in the DSM container in addition to the basic container of the BSM, and when the above-described message configuration schemes are selectively used, the DSM related data may be distinguished and transmitted in a flag representing the type of DSM container. Here, as an example, when a type ID is 001, raw data of measured sample values may be transmitted and when the type D is 010, a risk index may be derived and transmitted. Further, as an example, when the type ID is 011, 011 may represent dangerous zone information. Furthermore, a plurality of types may be complexly included in the DSM container or transmitted to represent a plurality of events.

Likewise, C-DSM related data may also be included in a C-DSM container in addition to the basic container of the BSM and the DSM container, and when the above-described message configuration schemes are selectively used, the C-DSM related data may be distinguished and transmitted in the flag representing the type of DSM container. The above-described contents may be applied to examples related to the type ID, so a duplicated description is omitted.

Meanwhile, passenger status related information may include the following contents. Here, the passenger may mean the driver and/or the passenger.

Driver status flag: The status of the driver may be classified as follows.

1. Drowsiness: Drowsy driving degree of driver (e.g., fatigued, drowsiness, and deep sleep), fatigue degree, and drowsy driving duration 2. Health reasons: Situations in which association of emergency medical institution is required due to an abnormal heart, unstable breathing, a seizure, stunning, shock, etc. A surrounding vehicle or a network that receives the flag may transmit the corresponding message to a surrounding emergency medical institution, and the corresponding institution may track statuses of the abnormal vehicle and the driver in the abnormal vehicle through the message.

3. Distracted driving: When the driver uses a smartphone for a predetermined time or more or does not keep eyes forward for a predetermined time or more.

4. Driver classification: Elderly driver, patient, pregnant woman, the elderly and the weak, disabled person, etc.

Monitoring and indicating passenger situation monitoring by cabin status monitoring (CSM): The CSM may be an extended concept of the DSM. Specifically, the driver and the passenger may be recognized through a camera, a communication (e.g., WiFi, cellular communication, V2X communication, etc.) device, etc., or driver and passenger information may be manually input, and the driver and passenger information and/or related images may be transmitted, The passenger situation is monitored by the CSM to acquire information described below.

1. Recognition of driver and passenger: A boarding status and related information of a vehicle passenger may be determined. Specifically, in the case of a passenger which has a risk sign on the health or has a problem for safe driving, when a status change related to the corresponding sign occurs, the status change may be rapidly determined and announced to the surrounding vehicle, the network, an emergency rescue center, etc. Alternatively, when the operation status of the vehicle is changed, it is determined that the change in operation status is caused by the risk sign of the driver even though the status change of the driver is not sensed, and as a result, the change in operation status may be notified to the outside. Meanwhile, when an accident occurs, a rescue activity may be executed based on the information by determining an actual location of the passenger, and more specific passenger information (e.g., a blood type, health and disease information, etc.) to take an appropriate action. A required advice may be provided to a user who may have a potential problem on the health or may be in danger during driving and traveling or the user may communicate with another associated user through an emergency communication network. Here, the passenger may be recognized by the following method.

(Method 1) Method for Acquiring Information Through Mounting of Passenger Recognition Camera for Each Seat Specifically, a passenger recognition camera for each seat may be mounted for major status monitoring through image processing, etc., for all passengers. The camera may be a camera for identifying the passenger or a camera for status determination through image processing.

Through Method 1, main driver and passenger information is stored in advance, and image information input through the camera and pre-registered information are compared to determine the statuses of the driver and passenger.

Here, when there is no matching information, the image information is transmitted to a V2X application server to request examining whether there is matching information. A possibility that information as the driver and the passenger will be registered in another vehicle other than the corresponding vehicle.

Further, here, when the matching information is not discovered, the driver and passenger information is requested in the camera and an interlocked device to allow the driver and the passenger to input related information. Alternatively, the driver and the passenger may transmit information thereof to the camera and the interlocked device through a device thereof. For example, the driver and the passenger may input the information thereof by utilizing voice recognition or the UI. The input information may include personal identification information including names, ages, telephone numbers, etc., of the driver and the passenger.

(Method 2) Method for Transmitting Personal Identification Information of Driver and Passenger to Device in Vehicle Driver's own information and main passenger information may be stored in a device of the driver. Here, the driver may input the driver information while using a related platform or application. Further, in respect to the passenger information, a passenger that possesses a device in which the platform or application is installed recognizes a device of the passenger when boarding the device of the driver (for example, may judge whether the user boards the vehicle according to whether a door of the vehicle is opened or closed), and as a result, the information of the passenger may be delivered to the device of the driver. Alternatively, the driver may manually input the passenger information in the device of the driver.

Further, the device of the passenger may store family registration information of the passenger or information on a fellow passenger of the passenger.

Here, the driver and the passenger may store, in the devices thereof, identification information such as vehicle numbers of vehicles which the driver and the passenger mainly ride in addition to vehicles driven thereby. Further, here, the driver device may acquire information of all passengers by collecting information of the driver and information of the passenger which are stored in advance. Other passengers may be new passengers. Specifically, the information of the passenger and sensed data for each seat (e.g., may be acquired by applying a weight sensor for each seat, an indoor directional antenna through the passenger device, indoor positioning, etc.) are compared to determine a boarding location of the passenger.

The driver and passenger information may include personal information, current health status information, and the like. As an example, the personal information may be input in advance through a user device, etc., and may include information including an age, a height, a weight, a blood type, a disease, etc. Further, the personal information may include information for classifying the driver and the passenger. For example, the personal information may include information such as an identifier classified into an elderly person, a patient, a child, a pregnant woman, a disabled person, etc. Further, as an example, the current health status information may be information measured and collected through the device in the vehicle, the user device, etc. For example, the current health status information may include information including biodata such as a momentum, the fatigue degree, the heart rate, breathing, etc., a health status, a sleep status, a concentration, a mood, etc.

The passenger information may be periodically transmitted, but transmitted when an event occurs. As an example, when a problem occurs in a health status of a specific passenger, the device of the passenger identifies the problem to transmit related information by a broadcast scheme. Further, in respect to the passenger information, an amount of the information may vary depending on an occurrence degree of the event. Specifically, when the problem on the health occurs or the accident occurs, more specific personal information of the driver and the passenger may be transmitted for emergency escort, emergency rescue, etc. As an example, the passenger information may additionally include on which seat the patient rides in an accident vehicle, medical related information such as an age, a weight, a blood type, etc. of the patient, etc.

Meanwhile, a message related to the status of the passenger may include a fatigue degree, a drowsiness level, a deep sleep status, a pulse status, a breathing status, whether seizure occurs, whether stunning occurs, whether shock occurs, a concentration (or distraction), etc., of the driver derived from measurement data in addition to the above-described eye trajectory measurement value, etc. The detailed fields may be distinguished in a form of the flag or when the detailed fields may be generated simultaneously, the detailed fields may be configured as independent fields, respectively.

Alternatively, since all situations or statuses related to the fields may not simultaneously occur, events which may occur may be selectively combined and distinguished by one flag. As an example, since the drowsiness and the deep sleep statuses may be independent events rather than the events which simultaneously occur, a sleep related field exists and when the flag is 0, the event may be distinguished as the drowsiness status and when the flag is 1, the event may be distinguished as the deep sleep status. Since the pulse and the breathing are important body signals, the pulse and the breathing are separately sensed, and statuses such as the seizure, the stunning, the shock, etc., may also be independently distinguished.

The respective fields as the independent fields may be configured to have the same bit number (e.g., 4 bits) or configured by different bit numbers according to a priority, an importance, an expression scheme of information, etc.

Further, the respective fields may digitize and express the level of the passenger status. As an example, the respective fields may be distinguished and expressed as 0 to 9. As a specific example, 0 may express a status having no problem, 9 may express a very serious status, values of 1 to 8 may express statuses of the passenger for stage, and 15 may express an emergency situation. Alternatively, the fields may express the duration, etc.

The message components may be included in a new message related to the DSM, included in a partial field or a reserved field of the BSM message, or included in a modified/extended BSM message.

Meanwhile, the message related to the status of the passenger may be periodically transmitted in the form of CAM message or transmitted in the form of the DENM message when a specific event occurs and/or a specific event is expected to occur.

Further, the operation status of the vehicle may be influenced by the abnormal situation of the driver, and among them, the operation status of the vehicle may be influenced primarily by steering, acceleration, and the deceleration. The detailed fields may be distinguished in a form of the flag or when the detailed fields may be generated simultaneously, the detailed fields may be configured as independent fields, respectively.

The respective fields as the independent fields may be configured to have the same bit number (e.g., 4 bits) or configured by different bit numbers according to a priority, an importance, an expression scheme of information, etc.

Further, the respective fields may digitize and express the level of the operation status of the vehicle. Alternatively, the fields may express the duration, etc. For example, in the case of the steering abnormality, the fields may express an instantaneous steering angle and in the case of the acceleration or the deceleration, the fields may express the acceleration or the deceleration. Furthermore, since a collision risk time due to the vehicle abnormality may also be influenced, the collision risk time may be separately expressed or expressed by using a value acquired from another message.

The message components may be included in a new message related to the vehicle status, included in a partial field or a reserved field of the BSM message, or included in a modified/extended BSM message.

Meanwhile, the message related to the status of the vehicle may be periodically transmitted in the form of CAM message or transmitted in the form of the DENM message when a specific event occurs and/or a specific event is expected to occur.

Figure 26:
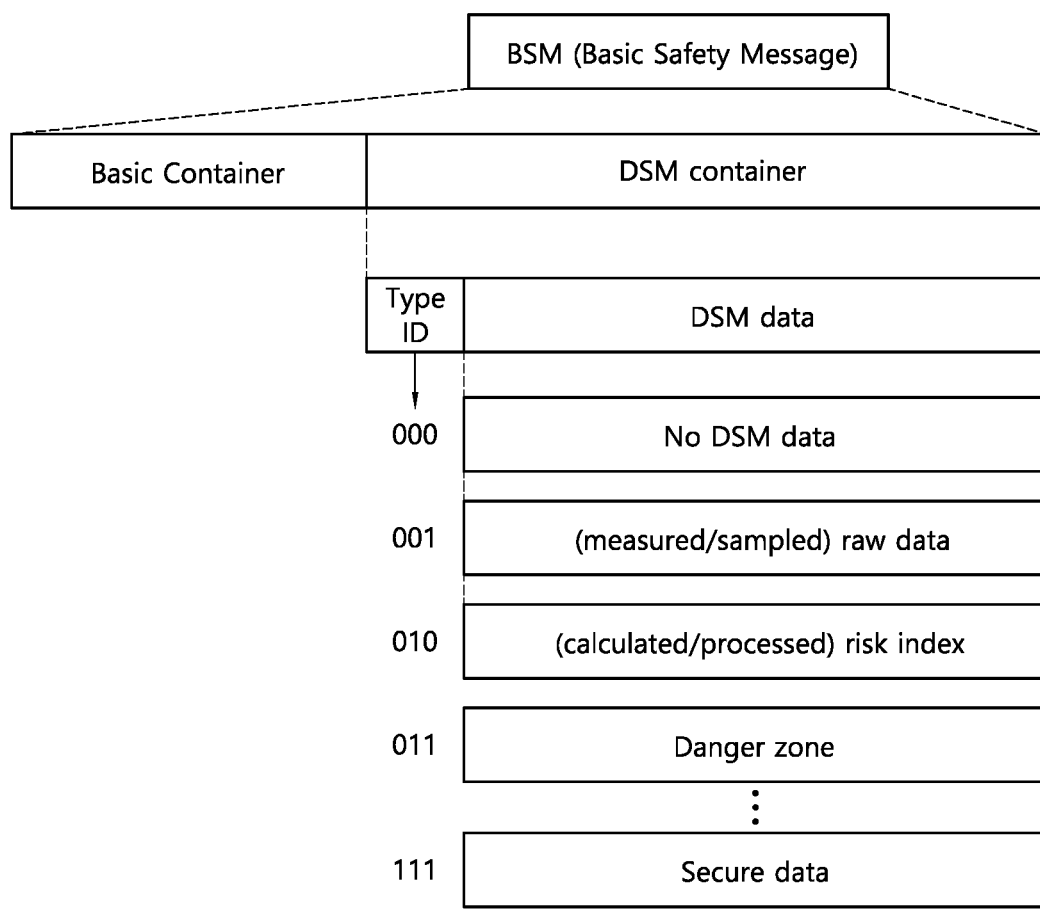
FIG. 26 illustrates an example of a DSM container according to some implementations of the present disclosure.

FIG. 26 illustrates an example of a DSM container according to some implementations of the present disclosure.

Referring to FIG. 26, a basic safety message (BSM) may include a basic container and a DSM container. A DSM container may consist of a type ID and DSM data. As an example of the type ID, 000 may indicate that there is no DSM data, 001 may indicate that the DSM data is raw data, 010 may indicate that the DSM data is a risk index, 011 may indicate that the DSM data is a risk/danger zone, and 111 may indicate that the DSM data is encrypted data (secure data), respectively.

Figure 27:
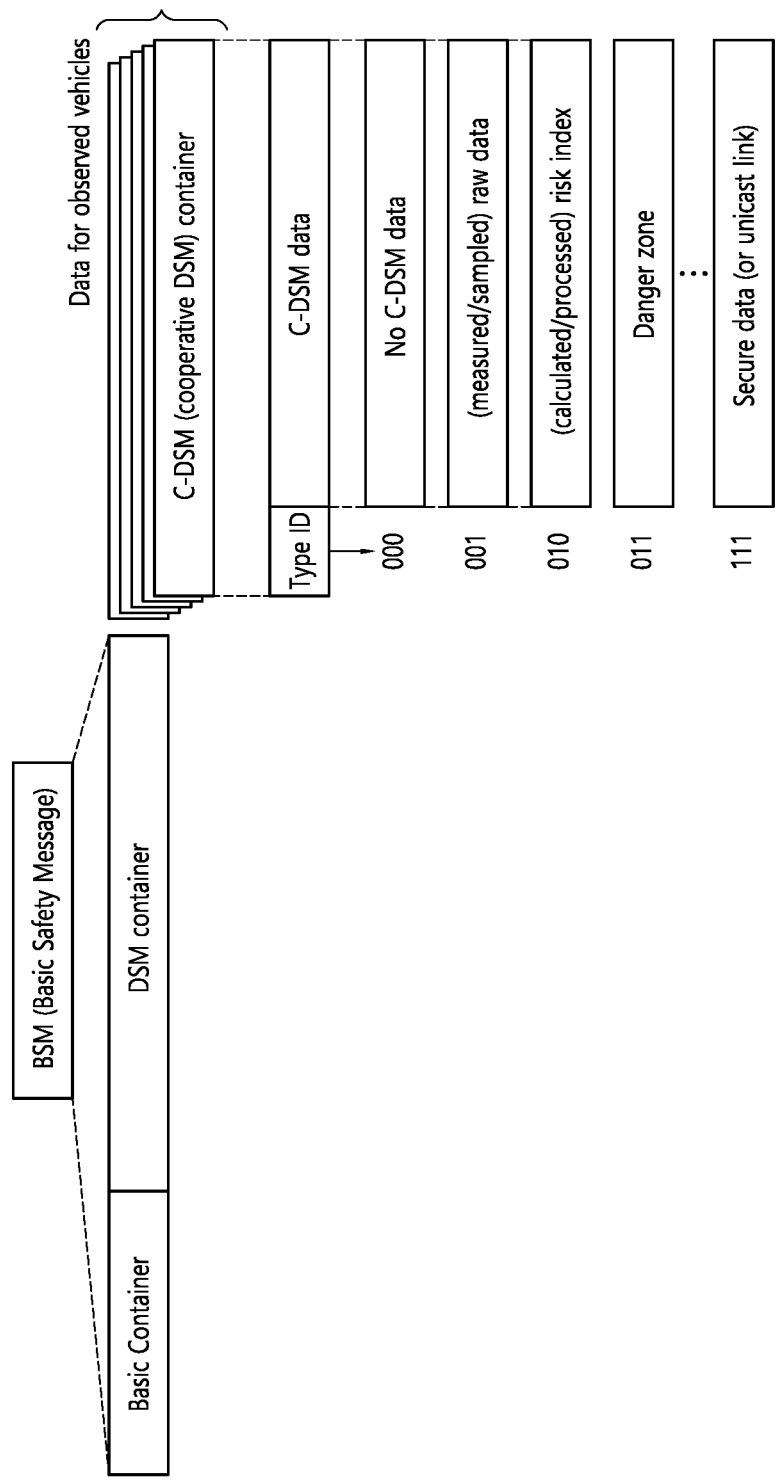
FIG. 27 shows an example of a C(cooperative)-DSM container according to some implementations of the present disclosure.

FIG. 27 shows an example of a C(cooperative)-DSM container according to some implementations of the present disclosure.

Referring to FIG. 27, a C-DSM container that is not included in a basic safety message (BSM) may exist separately. The C-DSM may include data about the observed vehicle.

The C-DSM container may consist of a type ID and C-DSM data. An example of the type ID may be the same as the example of FIG. 26. Furthermore, although not shown in FIG. 27, the type ID may be configured differently from FIG. 26.

Figure 28:
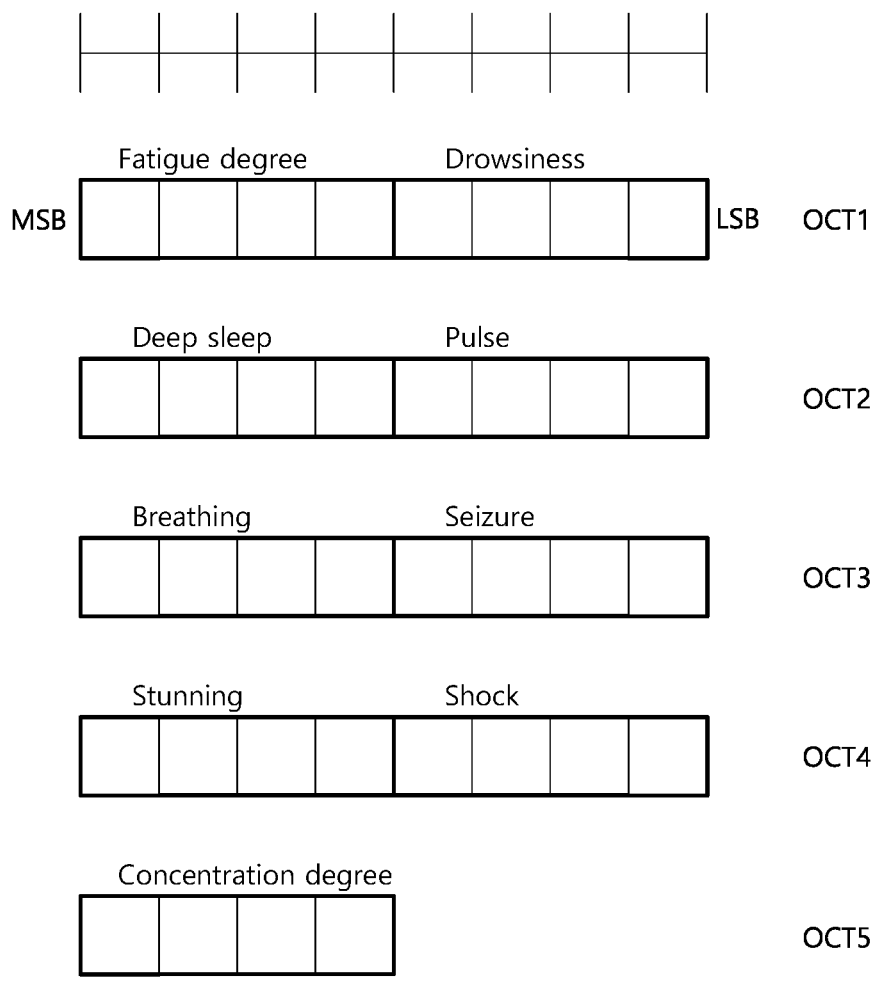
FIG. 28 illustrates an example of a driver status related DSM message according to some implementations of the present disclosure.

FIG. 28 illustrates an example of a driver status related DSM message according to some implementations of the present disclosure.

Referring to FIG. 28, the DSM message may include fatigue, drowsiness, deep sleep, pulse, breathing, seizure, fainting, shock, and concentration fields by 4 bits in bit-order. Here, fatigue and drowsiness may be classified as octet 1, deep sleep, pulse as octet 2, breathing and seizure as octet 3, fainting and shock as octet 4, and concentration as octet 5.

Figure 29:
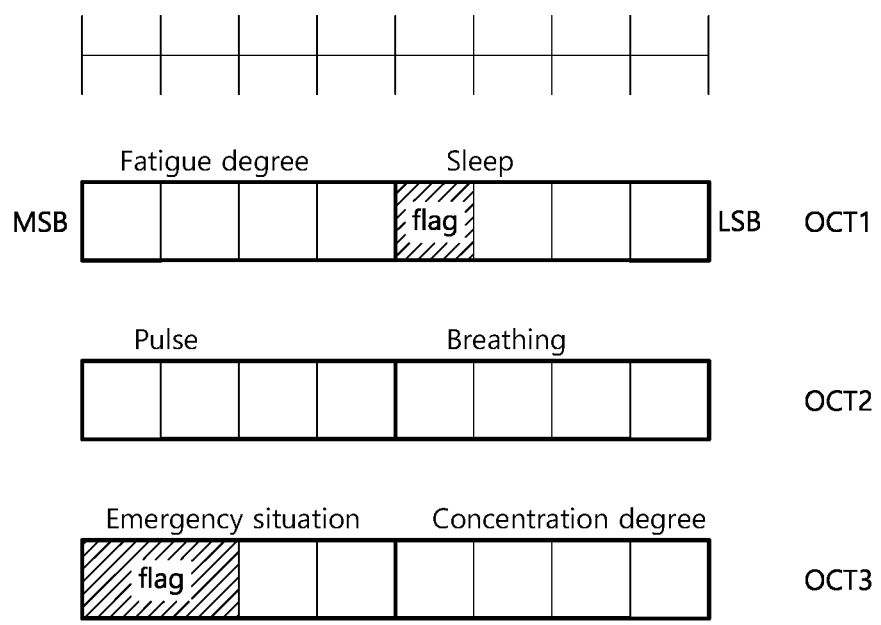
FIG. 29 illustrates another example of a driver state related DSM message according to some implementations of the present disclosure.

FIG. 29 illustrates another example of a driver state related DSM message according to some implementations of the present disclosure.

Referring to FIG. 29, 4 bits of least significant bit (LSB) of octet 1 of the DSM message may be a sleep field, and the first bit of the sleep field may be a flag of the sleep field. For example, if the flag of the sleep field is 0, it may be classified into a drowsy state, and if it is 1, it may be divided into a deep sleep state.

In addition, 4 bits of the most significant bit (MSB) of octet 3 of the DSM message may be an emergency field, and the first two bits of the emergency field may be flags of the emergency field. For example, when the flags of the emergency situation field are 0, 1, 2, and 3, it may mean seizure, stun, shock, and other emergency situations, respectively.

Figure 30:
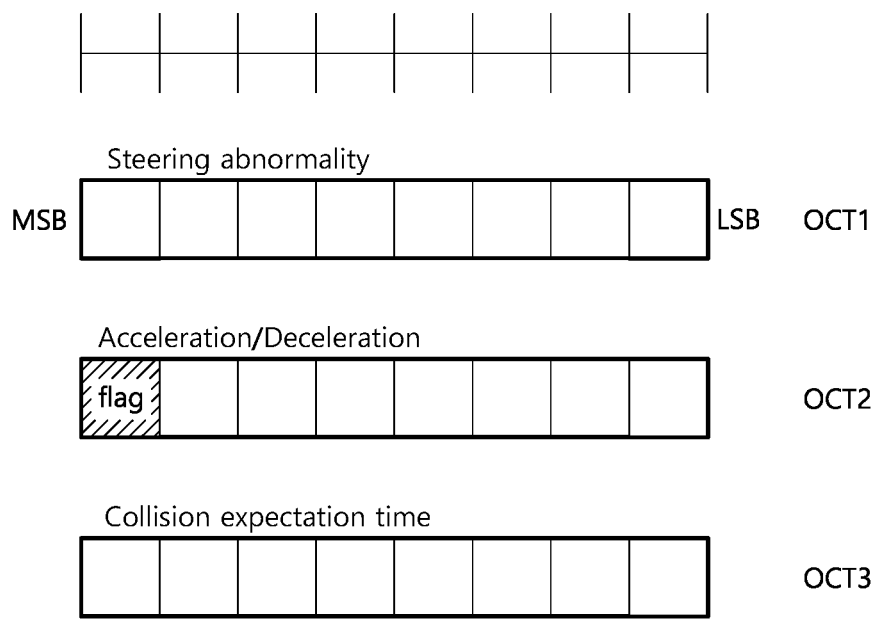
FIG. 30 illustrates an example of a vehicle status related DSM message according to some implementations of the present disclosure.

FIG. 30 illustrates an example of a vehicle status related DSM message according to some implementations of the present disclosure.

Referring to FIG. 30, the vehicle status related message may include a steering anomaly field for octet 1, an acceleration/deceleration field for octet 2, and an expected collision time field for octet 3 by each 8 bits in bit-order.

Hereinafter, methods for switching vehicle driving modes will be described.

When the abnormal sign occurs in a driver of a specific vehicle or when the specific vehicle is abnormally operated, if the specific vehicle does not return to a normal operation mode even through warning messages and notifications of surrounding vehicles, the specific vehicle may be in accident danger. The driving mode may be switched as below in response thereto.

However, in the driving mode switching, a type of an option which may be selected by a capability of the vehicle may be determined. As an example, among vehicles having no autonomous driving function, no driving assistance function, etc., a vehicle which also has a minimum emergency braking function has no function which the vehicle may autonomously perform, surrounding vehicles cannot but be careful.

On the contrary, when the corresponding vehicle includes a tele-operated driving (ToD) function, a scheme of switching to the corresponding mode may be considered. Further, it may be difficult for a vehicle of autonomous driving level 3 or more to move up to a final destination, but a motion of moving the vehicle up to a safe place may be possible. Further, in the case of a vehicle of autonomous driving level 4 or more, a motion of moving up to the final destination may be considered. Meanwhile, when the vehicles of autonomous driving level 3 or more include the ToD function, any one of autonomous driving and tele-operated driving may be selectively performed (e.g., a function preferred by the user is set in advance, etc.).

Meanwhile, here, the autonomous driving level may be as follows. The autonomous driving level 0 may be a stage in which the driver always controls and the system provides assistance in an emergency situation. Autonomous driving level 1 may be a stage in which the system provides steering or speed control, which may be a stage in which limited assistance is provided. Autonomous driving level 2 may be a stage where the system controls steering and speed. Autonomous driving level 3 may be a stage in which the driver intervenes in an emergency situation. The autonomous driving level 4 may be a stage in which the driver's intervention is not required. The autonomous driving level 5 may be a stage in which a driver is not required and fully autonomous driving is supported.

Switching to autonomous driving mode: Even at a time point before or after reporting the driver status to the surrounding vehicles and/or the infrastructure/network as described above, when up to a collision risk time (hereinafter, time-to-collision, TTC) remains to a preset specific threshold time or less, a specific vehicle may be switched to the autonomous driving mode and operated as compared with a collision with the surrounding vehicles. However, in a vehicle which does not have the autonomous driving mode or a vehicle in which a fully autonomous driving mode (e.g., autonomous driving level 5) is not supported, an autonomous driving mode of a highest level (e.g., autonomous driving levels 0 to 4) applicable may be applied through the ADAS function. Alternatively, the vehicle may be first stopped through an emergency brake function. When the specific vehicle operates in the autonomous driving mode or is emergently braked and stopped, since there is the risk of the secondary accident, the driver status or the operation status of the vehicle needs to be continuously announced to the surrounding vehicles and/or the infrastructure/network as described above.

Switching to escort driving mode: When the status of the driver and/or the vehicle is transmitted through the V2X message, the surrounding vehicle may be driven while leading the corresponding vehicle in the escort driving mode for accident prevention. A surrounding RSU or base station may discriminate which vehicle among the surrounding vehicles is suitable for escorting the specific vehicle. As an example, when a path of the specific vehicle partially or fully overlaps with the path of the abnormal vehicle, the specific vehicle becomes a candidate vehicle which may escort the abnormal vehicle, and in this case, a distance of the specific vehicle from the abnormal vehicle should be within a predetermined range. As an example, the predetermined range may be a distance enough such that the TTC of the specific vehicle to be maintained to the specific threshold time or more when the abnormal vehicle accesses the specific vehicle. The RSU or the base station may match a most appropriate vehicle among candidate vehicles and instruct the matched vehicle. When the escort vehicle is close to the abnormal vehicle, the escort vehicle may be driven by escorting the corresponding abnormal vehicle to a safe point with a control right for the abnormal vehicle. In this case, the status of the abnormal vehicle may be changed until escorting driving is established, and a particular measure may not be required up to a time point when the TTC is equal to or more than the specific threshold, but the escort vehicle may be driven in the autonomous driving mode at a time point when the TTC is less than the specific threshold time.

Switching to tele-operated driving mode: When a specific terminal transmits the status of the driver and/or the vehicle through the V2X message, the corresponding specific vehicle or surrounding vehicle may request tele-operated driving up to the safe point to a surrounding base station. When the base station reports this to a tele-operated driving center and a tele-operated driving driver is matched, the corresponding vehicle may be remotely driven up to the safe point with the control right for the specific vehicle. In this case, the status of the specific vehicle (e.g., a collision risk increases, etc.) may be changed until the tele-operated driving is established, and a particular measure may not be required up to a time point when the TTC is equal to or more than the specific threshold, but the specific vehicle may be driven in the autonomous driving mode at a time point when the TTC is less than the specific threshold time.

Figure 31:
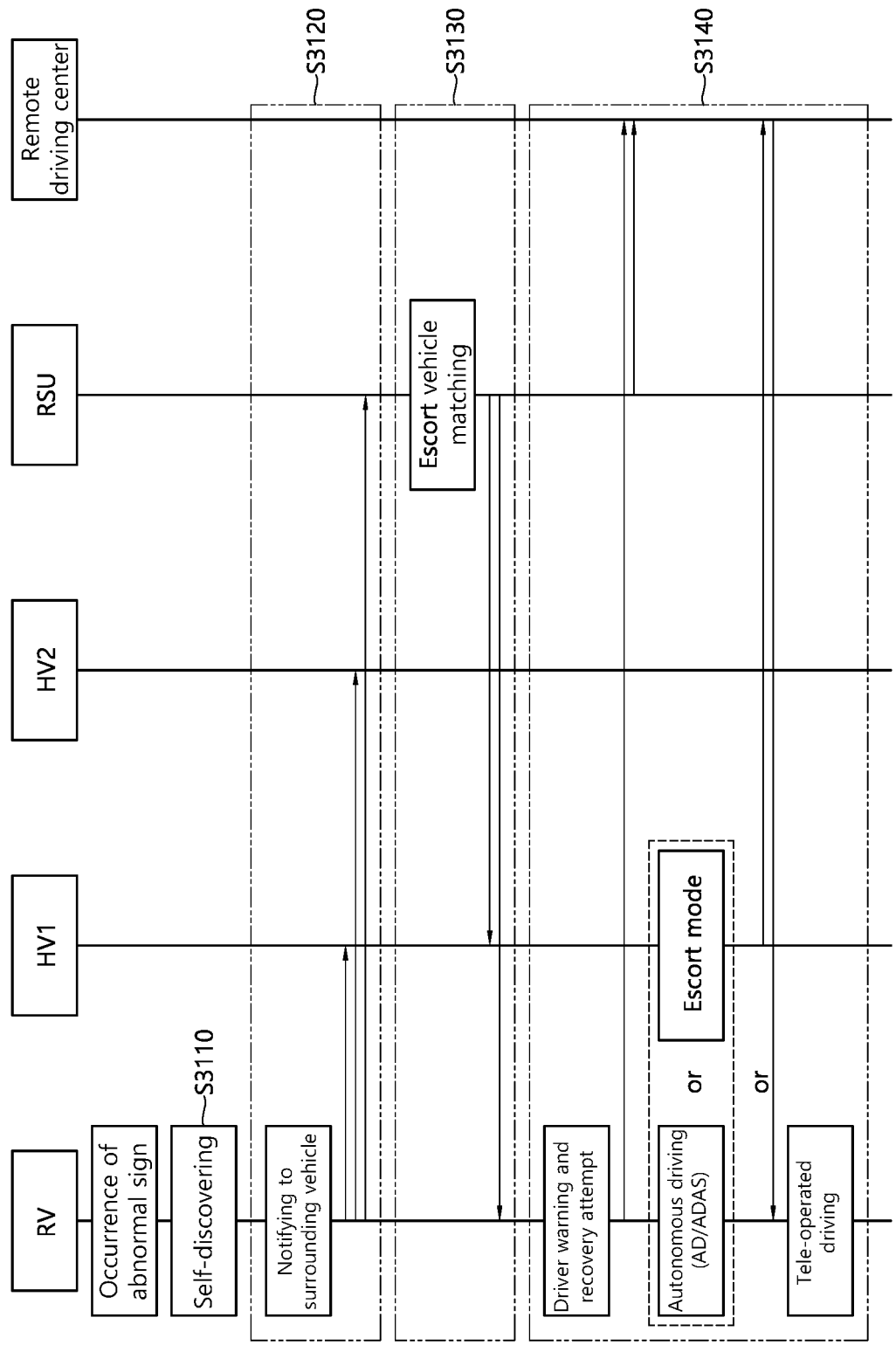
FIG. 31 is a flowchart of an example of an abnormal vehicle control method according to some implementations of the present disclosure.

FIG. 31 is a flowchart of an example of an abnormal vehicle control method according to some implementations of the present disclosure.

When an abnormality occurs in the driver of the abnormal vehicle RV and/or the abnormal vehicle itself, the abnormal vehicle detects the abnormality by itself (S3110).

Thereafter, the abnormal vehicle transmits a warning message to the surrounding vehicles (HV1, HV2) and the roadside unit (RSU) (S3120).

Thereafter, in step (S3130), the RSU may determine to operate in an escort mode for the RV. In this case, as an example, the RSU may match the escort vehicle for the RV to the HV1 and transmit related information to the RV and the HV1.

Alternatively, in step (S3140), the RV may warn the driver and attempt recovery by itself. The RV may notify the remote driving center of the results of the recovery attempt, or the RSU may report an abnormality of the RV to the remote driving center. Here, the RV may autonomously drive based on the autonomous driving mode, or may perform an escort operation by the HV1. Also, here, the RV may perform remote driving by a remote driving center.

Figure 32:
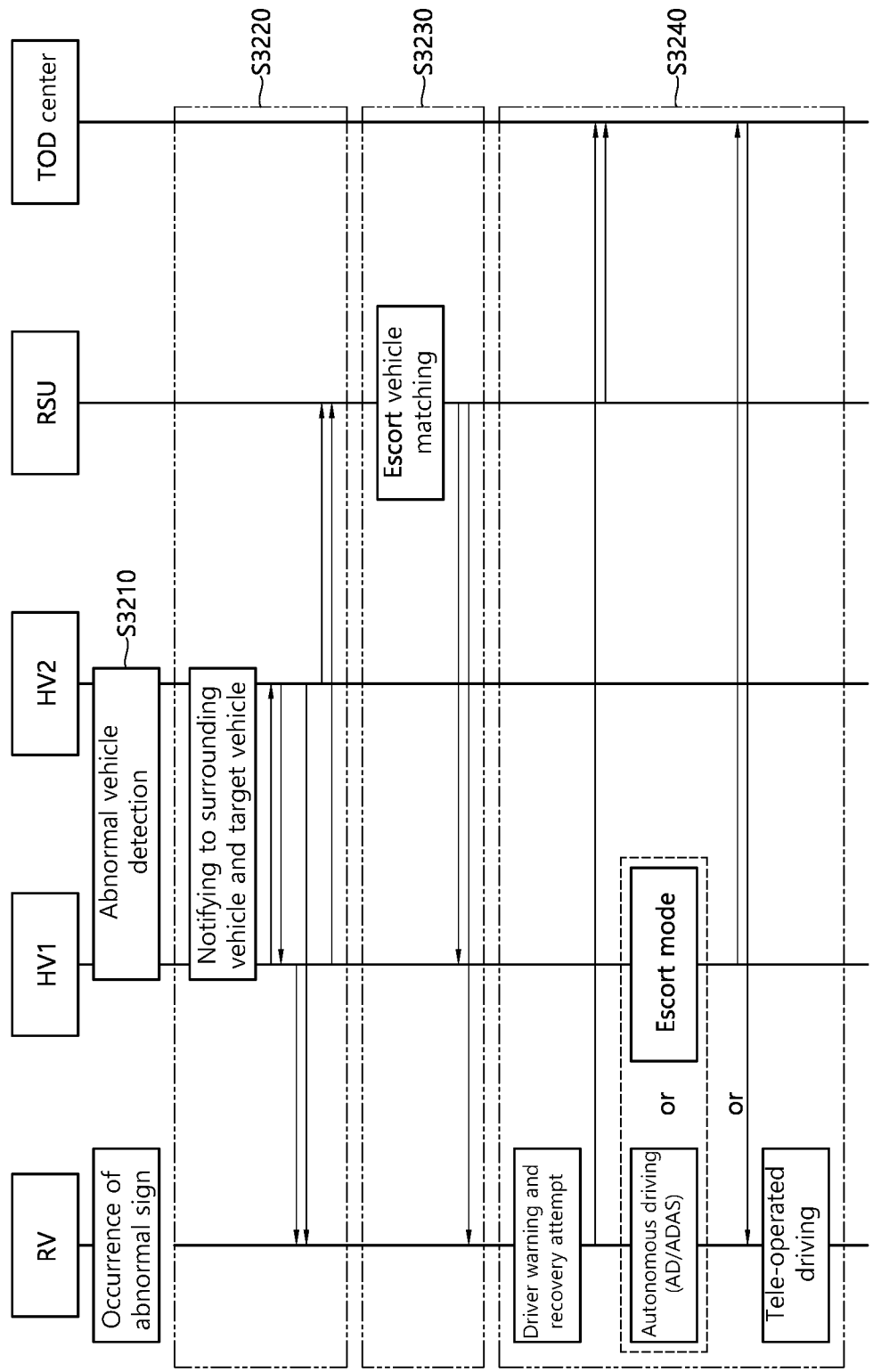
FIG. 32 is a flowchart of another example of a method for controlling an abnormal vehicle according to some implementations of the present disclosure.

FIG. 32 is a flowchart of another example of a method for controlling an abnormal vehicle according to some implementations of the present disclosure.

When an abnormality occurs in the driver of the abnormal vehicle (RV) and/or the abnormal vehicle itself, adjacent vehicles HV1 and/or HV2 of the abnormal vehicle discover an abnormal symptom of the RV (S3210).

Thereafter, HV1 and HV2 inform the surrounding vehicle, the RSU, and the target vehicle (RV) that an abnormal symptom has occurred in the RV (S3220).

Thereafter, in (S3230) step, the RSU may determine to operate in escort mode for the RV. In this case, as an example, the RSU may match the escort vehicle for the RV to the HV1 and transmit related information to the RV and the HV1.

Alternatively, in step (S3240), the RV may warn the driver and attempt recovery by itself. The RV may notify the remote driving center of the results of the recovery attempt, or the RSU may report an abnormality of the RV to the remote driving center. Here, the RV may autonomously drive based on the autonomous driving mode, or may perform an escort operation by the HV1. Also here, the RV may perform remote driving by a remote driving center.

Figure 33:
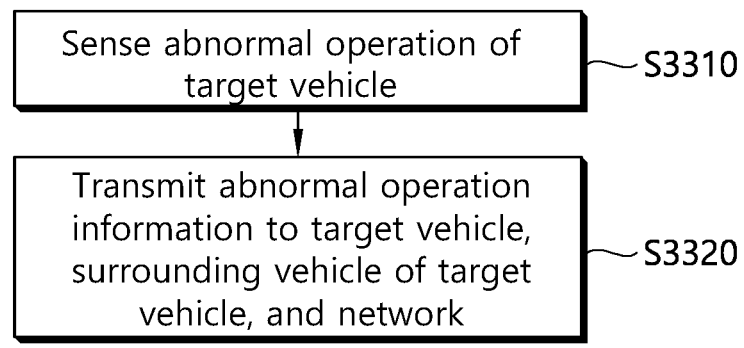
FIG. 33 is a flowchart of an example of a method for transmitting abnormal driving information of a measurement vehicle according to some implementations of the present disclosure.

FIG. 33 is a flowchart of an example of a method for transmitting abnormal driving information of a measurement vehicle according to some implementations of the present disclosure.

Referring to FIG. 33, the measurement vehicle detects abnormal operation of the target vehicle (S3310).

Thereafter, the measurement vehicle transmits the abnormal driving information to the target vehicle, surrounding vehicles of the target vehicle, and a network (S3320).

Here, the abnormal operation information may inform the abnormal operation. Also, here, the abnormal driving may include at least one of abnormal driving of the target vehicle and abnormal state of a passenger in the target vehicle.

Although not disclosed in FIG. 33, it is apparent that the embodiments proposed in the present disclosure may be applied to the method of FIG. 33.

Claims disclosed in the present disclosure may be combined by various schemes. For example, technical features of method claims of the present disclosure may be combined and implemented by the apparatus, and technical features of apparatus claims of the present disclosure may be combined and implemented by the method. Further, the technical features of the method claims and the technical features of the apparatus claims of the present disclosure may be combined and implemented by the device, and the technical features of the method claims and the technical features of the apparatus claims of the present disclosure may be combined and implemented by the method.

Hereinafter, an example of a communication system to which the present disclosure is applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 34:
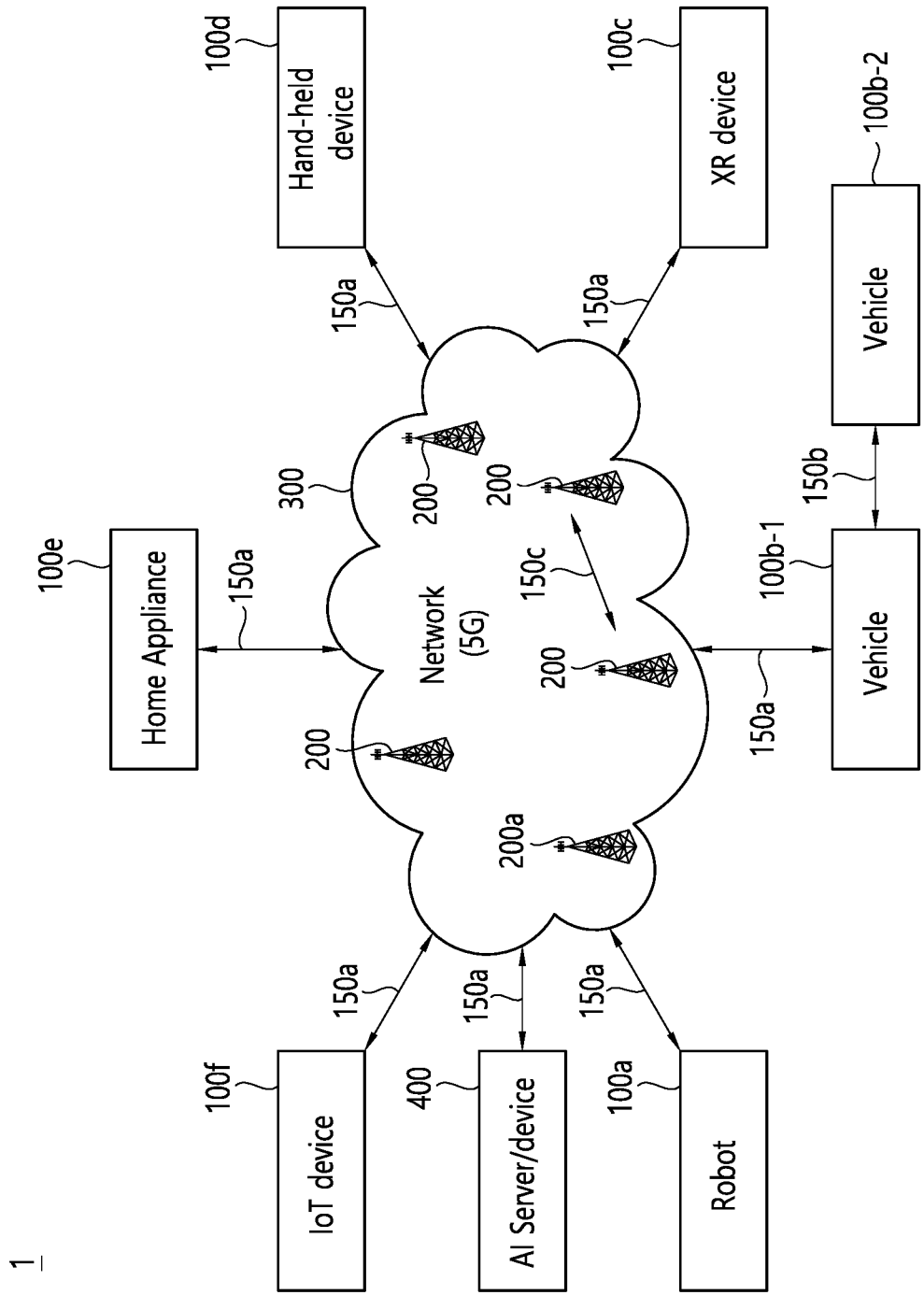
FIG. 34 shows a communication system (1), in accordance with an embodiment of the present disclosure.

FIG. 34 shows a communication system (1), in accordance with an embodiment of the present disclosure.

Referring to FIG. 34, a communication system (1) to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a~100f) may be connected to the network (300) via the BSs (200). An AI technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b, 150c) may be established between the wireless devices (100a~100f)/BS (200), or BS (200)/BS (200). Herein, the wireless communication/connections may be established through various RATs (e.g., 5G NR) such as uplink/downlink communication (150a), sidelink communication (150b) (or, D2D communication), or inter BS communication (e.g. relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 35:
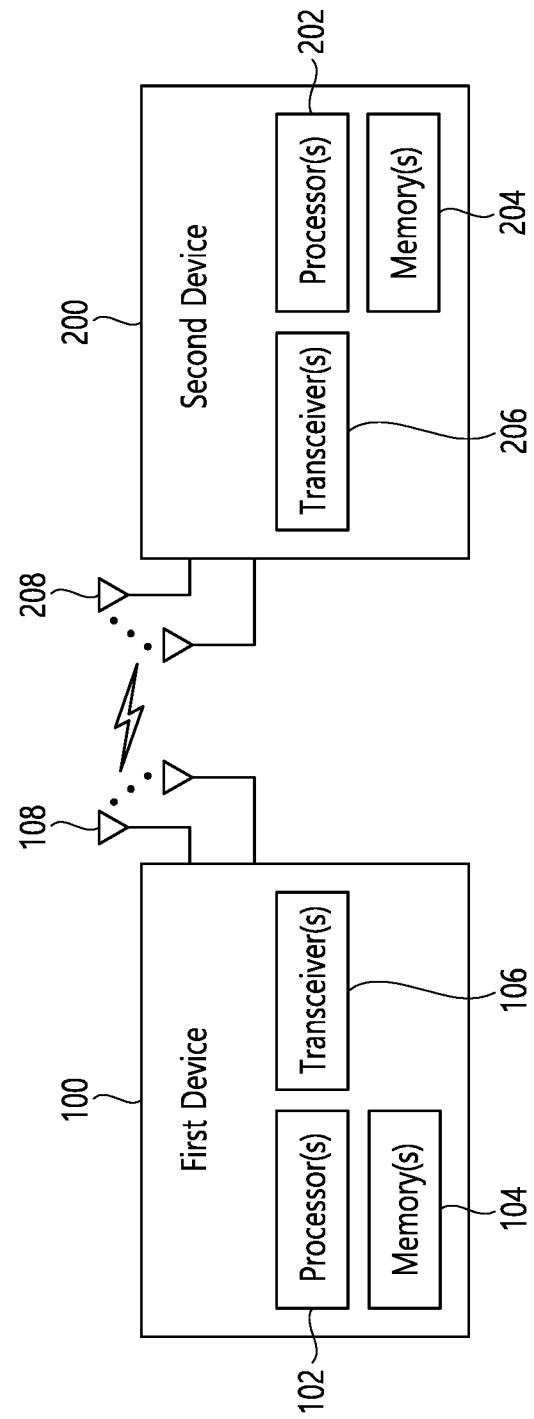
FIG. 35 shows wireless devices, in accordance with an embodiment of the present disclosure.

FIG. 35 shows wireless devices, in accordance with an embodiment of the present disclosure.

Referring to FIG. 35, a first wireless device (100) and a second wireless device (200) may transmit radio signals through a variety of RATs (e.g., LTE and NR). Herein, {the first wireless device (100) and the second wireless device (200)} may correspond to {the wireless device (100x), the BS (200)} and/or {the wireless device (100x), the wireless device (100x)} of FIG. 34.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store a variety of information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (106) and then store information obtained by processing the fourth information/ signals in the memory(s) (204). The memory(s) (204) may be connected to the processor(s) (202) and may store a variety of information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. To this end, the one or more transceivers (106, 206) may include (analog) oscillators and/or filters.

Figure 36:
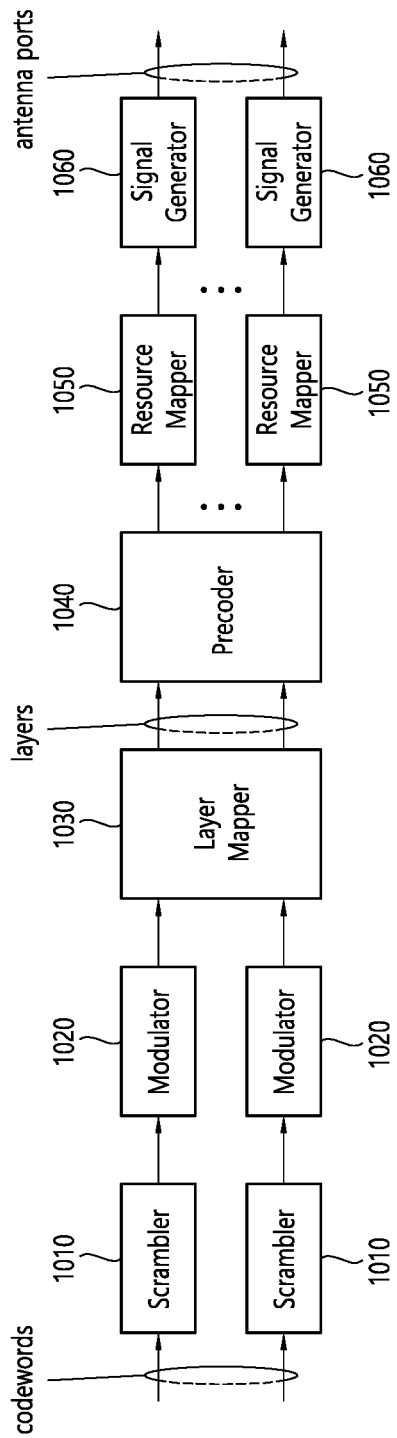
FIG. 36 shows a signal process circuit for a transmission signal, in accordance with an embodiment of the present disclosure.

FIG. 36 shows a signal process circuit for a transmission signal, in accordance with an embodiment of the present disclosure.

Referring to FIG. 36, a signal processing circuit (1000) may include scramblers (1010), modulators (1020), a layer mapper (1030), a precoder (1040), resource mappers (1050), and signal generators (1060). An operation/function of FIG. 36 may be performed, without being limited to, the processors (102, 202) and/or the transceivers (106, 206) of FIG. 35. Hardware elements of FIG. 36 may be implemented by the processors (102, 202) and/or the transceivers (106, 206) of FIG. 35. For example, blocks 1010~1060 may be implemented by the processors (102, 202) of FIG. 35. Alternatively, the blocks 1010~1050 may be implemented by the processors (102, 202) of FIG. 35 and the block 1060 may be implemented by the transceivers (106, 206) of FIG. 35.

Codewords may be converted into radio signals via the signal processing circuit (1000) of FIG. 36. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 36. For example, the wireless devices (e.g., 100, 200 of FIG. 35) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 37:
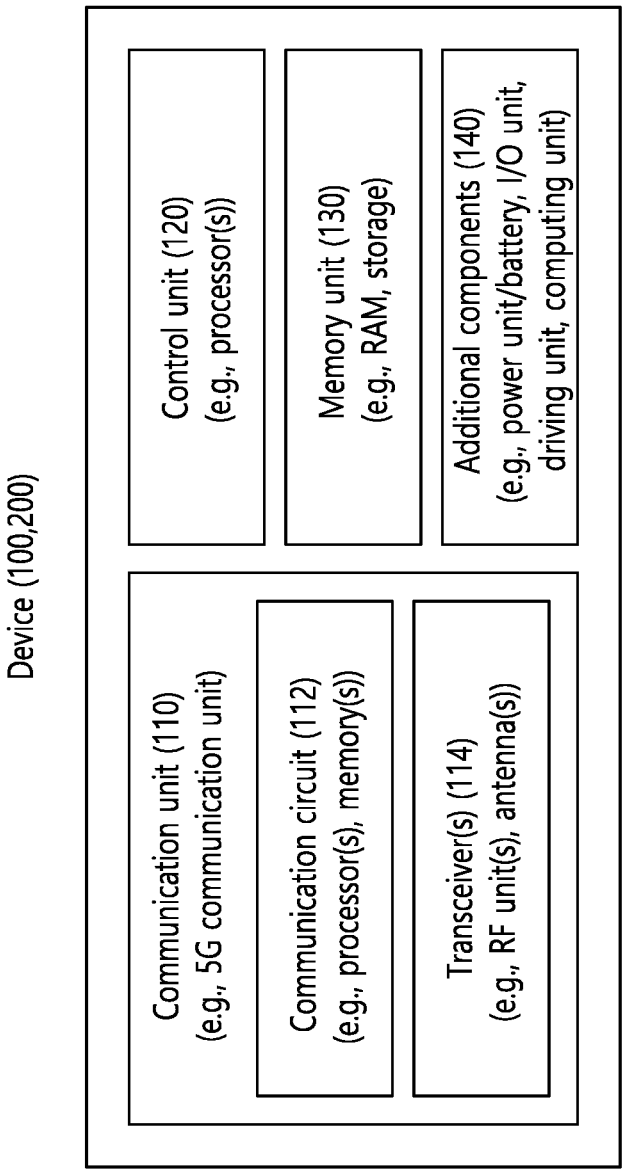
FIG. 37 shows another example of a wireless device, in accordance with an embodiment of the present disclosure.

FIG. 37 shows another example of a wireless device, in accordance with an embodiment of the present disclosure. The wireless device may be implemented in various forms according to a use-case/service (refer to FIG. 34).

Referring to FIG. 37, wireless devices (100, 200) may correspond to the wireless devices (100, 200) of FIG. 35 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 35. For example, the transceiver(s) (114) may include the one or more transceivers (106, 206) and/or the one or more antennas (108, 208) of FIG. 35. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 34), the vehicles (100b-1, 100b-2 of FIG. 34), the XR device (100c of FIG. 34), the hand-held device (100d of FIG. 34), the home appliance (100e of FIG. 34), the IoT device (100f of FIG. 34), a digital broadcast terminal, a hologram device, a public safety device, an MTC device, a medicine device, a fintech device (or a finance device), a security device, a climate/environment device, the AI server/device (400 of FIG. 34), the BSs (200 of FIG. 34), a network node, and so on. The wireless device may be used in a mobile or fixed place according to a use-example/service.

In FIG. 37, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 37 will be described in detail with reference to the drawings.

Figure 38:
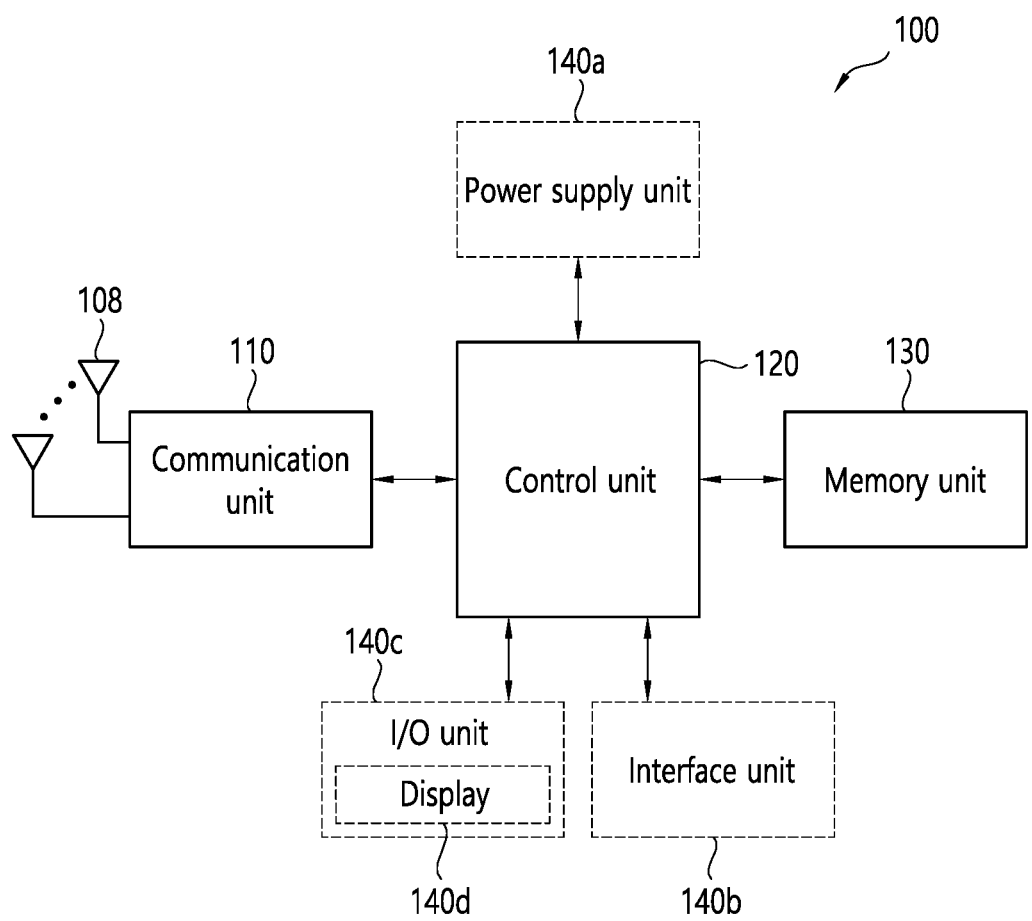
FIG. 38 shows a hand-held device, in accordance with an embodiment of the present disclosure.

FIG. 38 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 38, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110~130/140a~140c correspond to the blocks 110~130/140 of FIG. 37, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, and so on. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 39:
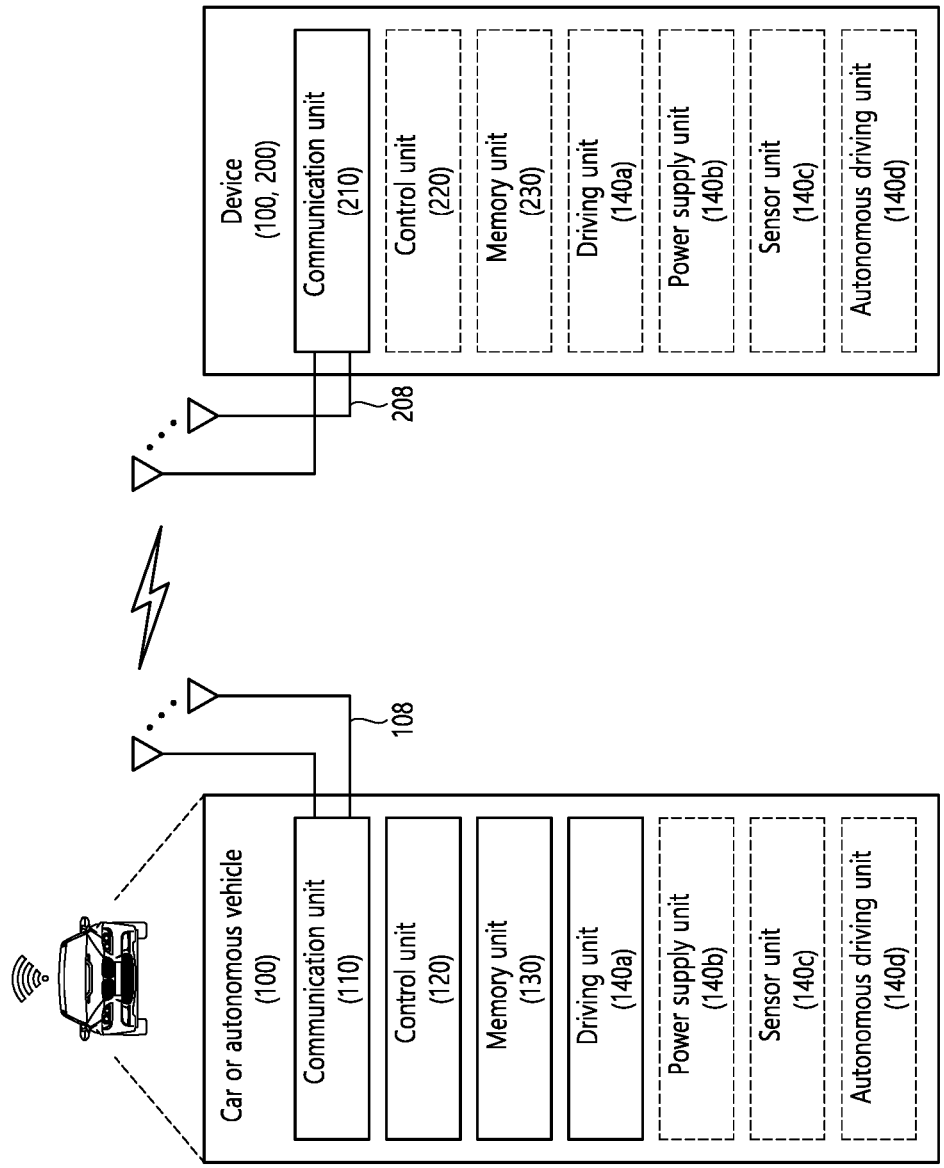
FIG. 39 shows a vehicle or an autonomous vehicle, in accordance with an embodiment of the present disclosure.

FIG. 39 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, and so on.

Referring to FIG. 39, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a~140d correspond to the blocks 110/130/140 of FIG. 37, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, and so on. The power supply unit (140b) may supply power to the vehicle or the autonomous vehicle (100) and include a wired/wireless charging circuit, a battery, and so on. The sensor unit (140c) may obtain a vehicle state, ambient environment information, user information, and so on. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, and so on, from an external server. The autonomous driving unit (140d) may generate an autonomous driving path and a driving plan from the obtained data. The control unit (120) may control the driving unit (140a) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Figure 40:
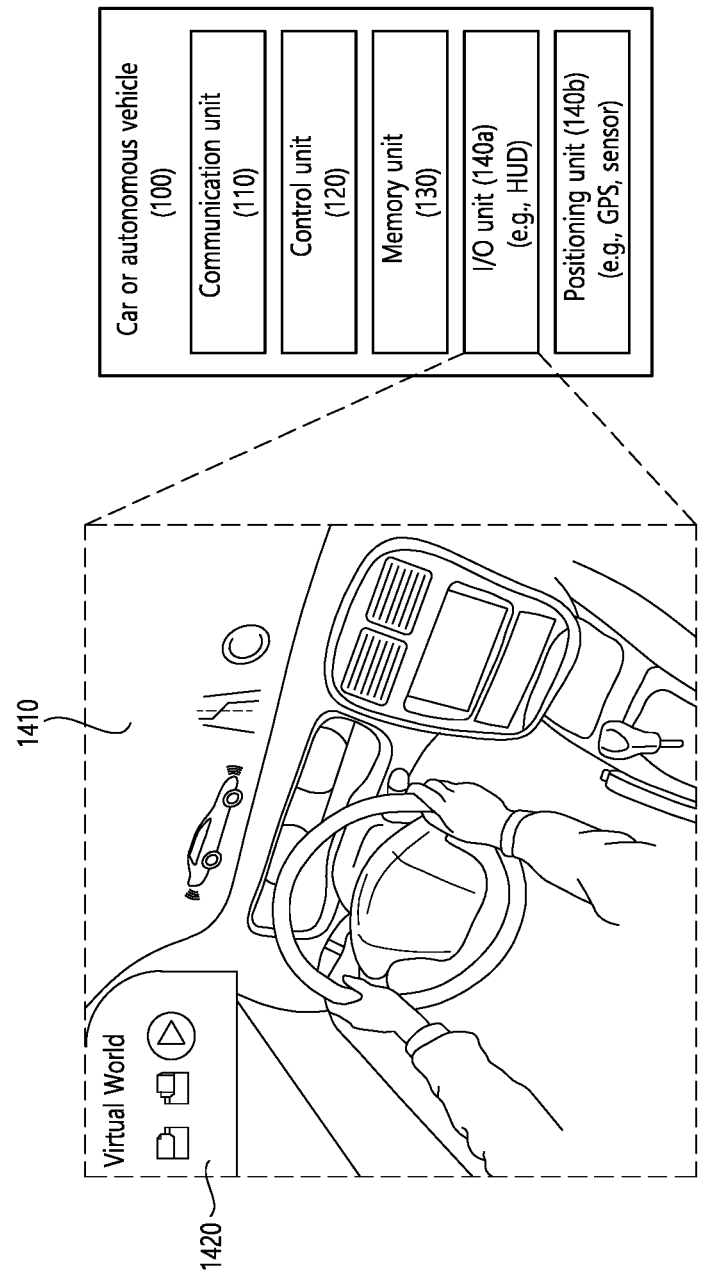
FIG. 40 shows a vehicle, in accordance with an embodiment of the present disclosure.

FIG. 40 shows a vehicle, in accordance with an embodiment of the present disclosure. The vehicle may be implemented as a transport means, an aerial vehicle, a ship, and so on.

Referring to FIG. 40, a vehicle (100) may include a communication unit (110), a control unit (120), a memory unit (130), an I/O unit (140a), and a positioning unit (140b). Herein, the blocks 110~130/140a~140b correspond to blocks 110~130/140 of FIG. 37.

The communication unit (110) may transmit and receive signals (e.g., data and control signals) to and from external devices such as other vehicles or BSs. The control unit (120)

may perform various operations by controlling constituent elements of the vehicle (100). The memory unit (130) may store data/parameters/programs/code/commands for supporting various functions of the vehicle (100). The I/O unit (140*a*) may output an AR/VR object based on information within the memory unit (130). The I/O unit (140*a*) may include an HUD. The positioning unit (140*b*) may obtain information on the position of the vehicle (100). The position information may include information on an absolute position of the vehicle (100), information on the position of the vehicle (100) within a traveling lane, acceleration information, and information on the position of the vehicle (100) from a neighboring vehicle. The positioning unit (140*b*) may include a GPS and various sensors.

As an example, the communication unit (110) of the vehicle (100) may receive map information and traffic information from an external server and store the received information in the memory unit (130). The positioning unit (140*b*) may obtain the vehicle position information through the GPS and various sensors and store the obtained information in the memory unit (130). The control unit (120) may generate a virtual object based on the map information, traffic information, and vehicle position information and the I/O unit (140*a*) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140*a*). In addition, the control unit (120) may broadcast a warning message regarding driving abnormality to neighboring vehicles through the communication unit (110). According to situation, the control unit (120) may transmit the vehicle position information and the information on driving/vehicle abnormality to related organizations.

Figure 41:
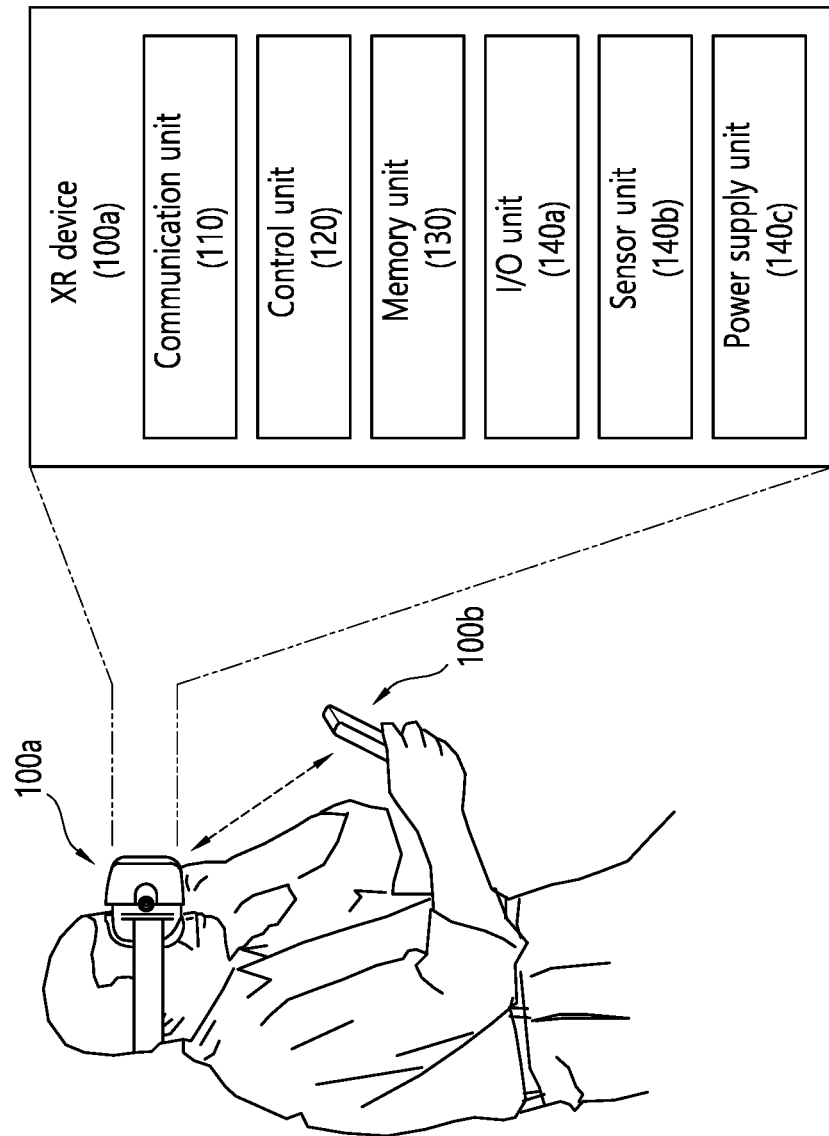
FIG. 41 shows an XR device, in accordance with an embodiment of the present disclosure.

FIG. 41 shows an XR device, in accordance with an embodiment of the present disclosure. The XR device may be implemented by an HMD, an HUD mounted in a vehicle, a television, a smartphone, a computer, a wearable device, a home appliance, a digital signage, a vehicle, a robot, and so on.

Referring to FIG. 41, an XR device (100*a*) may include a communication unit (110), a control unit (120), a memory unit (130), an I/O unit (140*a*), a sensor unit (140*b*), and a power supply unit (140*c*). Herein, the blocks 110~130/140*a*~140*c* correspond to the blocks 110~130/140 of FIG. 37, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100*a*). For example, the control unit (120) may be configured to control and/or perform procedures such as video/image acquisition, (video/image) encoding, and metadata generation and processing. The memory unit (130) may store data/parameters/programs/code/commands needed to drive the XR device (100*a*)/generate XR object. The I/O unit (140*a*) may obtain control information and data from the exterior and output the generated XR object. The I/O unit (140*a*) may include a camera, a microphone, a user input unit, a display unit, a speaker, and/or a haptic module. The sensor unit (140*b*) may obtain an XR device state, surrounding environment information, user information, and so on. The sensor unit (140*b*) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140*c*) may supply power to the XR device (100*a*) and include a wired/wireless charging circuit, a battery, and so on.

For example, the memory unit (130) of the XR device (100*a*) may include information (e.g., data) needed to generate the XR object (e.g., an AR/VR/MR object). The I/O unit (140*a*) may receive a command for manipulating the XR device (100*a*) from a user and the control unit (120) may drive the XR device (100*a*) according to a driving command of a user. For example, when a user desires to watch a film or news through the XR device (100*a*), the control unit (120) transmits content request information to another device (e.g., a hand-held device 100*b*) or a media server through the communication unit (130). The communication unit (130) may download/stream content such as films or news from another device (e.g., the hand-held device 100*b*) or the media server to the memory unit (130). The control unit (120) may control and/or perform procedures such as video/image acquisition, (video/image) encoding, and metadata generation/processing with respect to the content and generate/output the XR object based on information on a surrounding space or a real object obtained through the I/O unit (140*a*)/sensor unit (140*b*).

The XR device (100*a*) may be wirelessly connected to the hand-held device (100*b*) through the communication unit (110) and the operation of the XR device (100*a*) may be controlled by the hand-held device (100*b*). For example, the hand-held device (100*b*) may operate as a controller of the XR device (100*a*). To this end, the XR device (100*a*) may obtain information on a 3D position of the hand-held device (100*b*) and generate and output an XR object corresponding to the hand-held device (100*b*).

Figure 42:
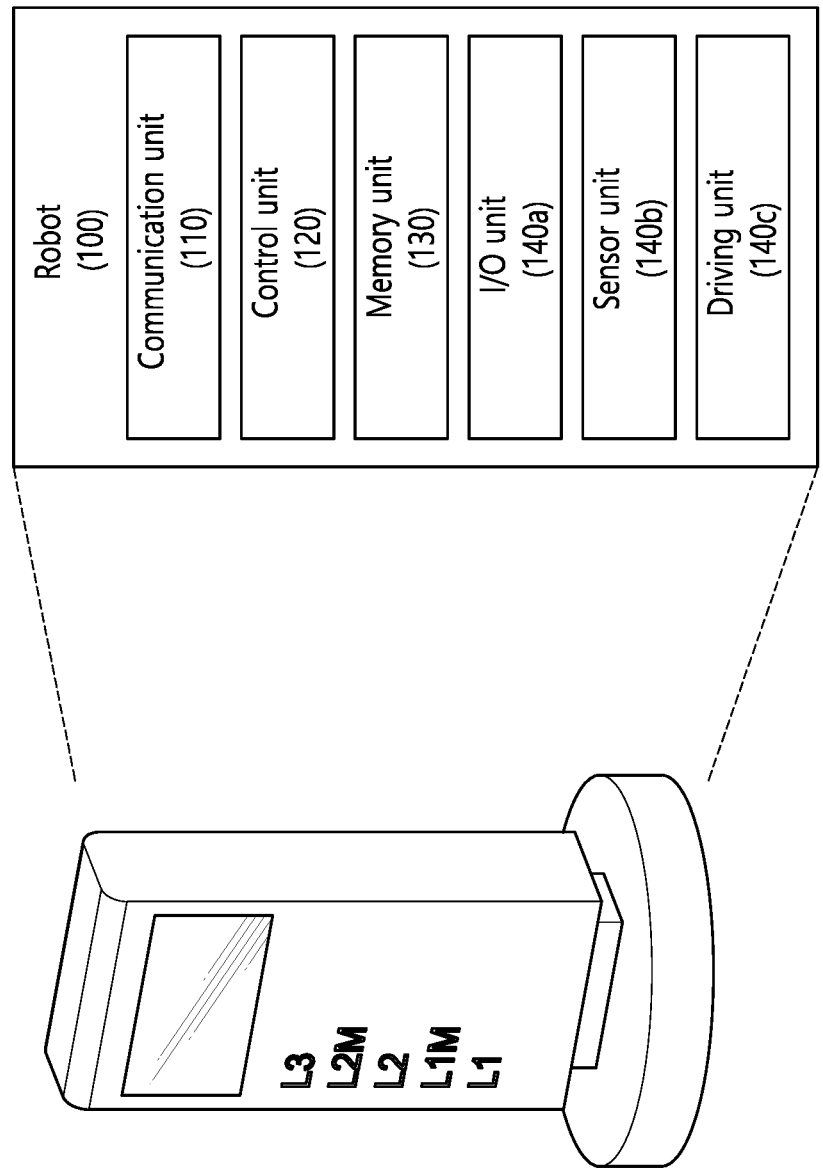
FIG. 42 shows a robot, in accordance with an embodiment of the present disclosure.

FIG. 42 shows a robot, in accordance with an embodiment of the present disclosure. The robot may be categorized into an industrial robot, a medical robot, a household robot, a military robot, and so on, according to a used purpose or field.

Referring to FIG. 42, a robot (100) may include a communication unit (110), a control unit (120), a memory unit (130), an I/O unit (140*a*), a sensor unit (140*b*), and a driving unit (140*c*). Herein, the blocks 110~130/140*a*~140*c* correspond to the blocks 110~130/140 of FIG. 37, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140*a*) may obtain information from the exterior of the robot (100) and output information to the exterior of the robot (100). The I/O unit (140a) may include a camera, a microphone, a user input unit, a display unit, a speaker, and/or a haptic module. The sensor unit (140b) may obtain internal information of the robot (100), surrounding environment information, user information, and so on. The sensor unit (140b) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, and so on. The driving unit (140c) may perform various physical operations such as movement of robot joints. In addition, the driving unit (140c) may cause the robot (100) to travel on the road or to fly. The driving unit (140c) may include an actuator, a motor, a wheel, a brake, a propeller, and so on.

Figure 43:
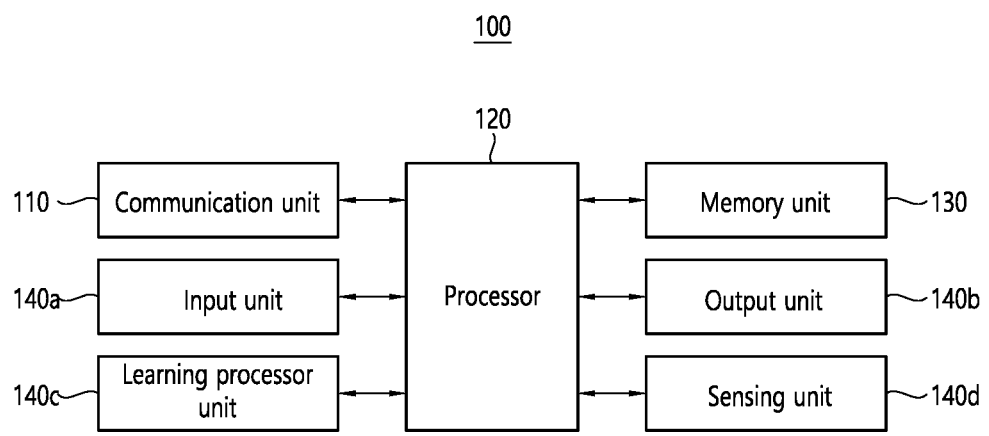
FIG. 43 shows an AI device, in accordance with an embodiment of the present disclosure.

FIG. 43 shows an AI device, in accordance with an embodiment of the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, and so on.

Referring to FIG. 43, an AI device (100) may include a communication unit (110), a control unit (120), a memory unit (130), an I/O unit (140a/140b), a learning processor unit (140c), and a sensor unit (140d). The blocks 110~130/140a~140d correspond to blocks 110~130/140 of FIG. 37, respectively.

The communication unit (110) may transmit and receive wired/radio signals (e.g., sensor information, user input, learning models, or control signals) to and from external devices such as other AI devices (e.g., 100x, 200, 400 of FIG. 34) or an AI server (e.g., 400 of FIG. 34) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 34). The collected history information may be used to update a learning model.

The memory unit (130) may store data for supporting various functions of the AI device (100). For example, the memory unit (130) may store data obtained from the input unit (140a), data obtained from the communication unit (110), output data of the learning processor unit (140c), and data obtained from the sensor unit (140). The memory unit (130) may store control information and/or software code needed to operate/drive the control unit (120).

The input unit (140a) may obtain various types of data from the exterior of the AI device (100). For example, the input unit (140a) may obtain learning data for model learning, and input data to which the learning model is to be applied. The input unit (140a) may include a camera, a microphone, and/or a user input unit. The output unit (140b) may generate output related to a visual, auditory, or tactile sense. The output unit (140b) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140c) may learn a model consisting of artificial neural networks, using learning data. The learning processor unit (140c) may perform AI processing together with the learning processor unit of the AI server (400 of FIG. 34). The learning processor unit (140c) may process information received from an external device through the communication unit (110) and/or information stored in the memory unit (130). In addition, an output value of the learning processor unit (140c) may be transmitted to the external device through the communication unit (110) and may be stored in the memory unit (130).

What is claimed is:

1. A method performed by a vehicle in a wireless communication system, the method comprising:
   detecting an abnormal operation of the vehicle,
   wherein the abnormal operation includes at least one of abnormal steering, abnormal acceleration, or abnormal deceleration;
   displaying and alarming a warning message in the vehicle;
   starting a timer upon displaying the warning message;
   transmitting a Driver Status Flag informing the abnormal operation to at least one surrounding vehicle or a roadside unit (RSU) upon detecting the abnormal operation;
   receiving, from the RSU, an information on (i) an escort mode driving and (ii) a specific surrounding vehicle for the escort mode; and
   based on the abnormal operation being detected before the timer expires, performing the escort mode driving with the specific surrounding vehicle based on the received information,
   wherein the abnormal steering represents that the vehicle is operated horizontally at a threshold distance or more based on an operation of the vehicle,
   wherein the abnormal acceleration represents that the vehicle is accelerated at an acceleration threshold or more,
   wherein the abnormal deceleration represents that the vehicle is decelerated at a deceleration threshold or more, and
   wherein the Driver Status Flag is included in a decentralized environmental notification message (DENM).

2. The method of claim 1, wherein the Driver Status Flag is transmitted by a broadcast scheme or a unicast scheme.

3. An apparatus in a vehicle, comprising:
   one or more memories storing instructions;
   one or more transceivers; and
   one or more processors connecting the one or more memories and the one or more transceivers, wherein the one or more processors execute the instructions to:

detect an abnormal operation of the vehicle, wherein the abnormal operation includes at least one of abnormal steering, abnormal acceleration, or abnormal deceleration;

display and alarm a warning message in the vehicle;

start a timer upon displaying the warning message;

transmit a Driver Status Flag informing the abnormal operation to at least one surrounding vehicle or a roadside unit (RSU) upon detecting the abnormal operation;

receive, from the RSU, an information on (i) an escort mode driving and (ii) a specific surrounding vehicle for the escort mode; and based on the abnormal operation being detected before the timer expires, perform the escort mode driving with the specific surrounding vehicle based on the received information, wherein the abnormal steering represents that the vehicle is operated horizontally at a threshold distance or more based on an operation of the vehicle, wherein the abnormal acceleration represents that the vehicle is accelerated at an acceleration threshold or more, wherein the abnormal deceleration represents that the vehicle is decelerated at a deceleration threshold or more, and wherein the Driver Status Flag is included in a decentralized environmental notification message (DENM).

4. The apparatus of claim 3, wherein the vehicle communicates with at least one of a mobile terminal, a network, and an autonomous driving vehicle other than the vehicle.

5. An apparatus set to control a vehicle, the apparatus comprising:

one or more processors; and one or more memories connected to be executable by the one or more processors and storing instructions, wherein the one or more processors execute the instructions to:

detect an abnormal operation of the vehicle, wherein the abnormal operation includes at least one of abnormal steering, abnormal acceleration, or abnormal deceleration;

display and alarm a warning message in the vehicle;

start a timer upon displaying the warning message;

transmit a Driver Status Flag informing the abnormal operation to at least one surrounding vehicle or a roadside unit (RSU) upon detecting the abnormal operation;

receive, from the RSU, an information on (i) an escort mode driving and (ii) a specific surrounding vehicle for the escort mode; and based on the abnormal operation being detected before the timer expires, perform the escort mode driving with the specific surrounding vehicle based on the received information, wherein the abnormal steering represents that the vehicle is operated horizontally at a threshold distance or more based on an operation of the vehicle, wherein the abnormal acceleration represents that the vehicle is accelerated at an acceleration threshold or more, wherein the abnormal deceleration represents that the vehicle is decelerated at a deceleration threshold or more, and wherein the Driver Status Flag is included in a decentralized environmental notification message (DENM).

* * * * *